(12) United States Patent
Brener et al.

(10) Patent No.: US 10,054,839 B1
(45) Date of Patent: Aug. 21, 2018

(54) NONLINEAR OPTICAL FREQUENCY CONVERSION USING METAMATERIAL ARRAYS

(71) Applicant: National Technology & Engineering Solutions of Sandia, LLC, Albuquerque, NM (US)

(72) Inventors: Igal Brener, Albuquerque, NM (US); Sheng Liu, Albuquerque, NM (US); Michael B. Sinclair, Albuquerque, NM (US); Polina Vabishchevich, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/624,478

(22) Filed: Jun. 15, 2017

Related U.S. Application Data

(63) Continuation-in-part of application No. 15/184,929, filed on Jun. 16, 2016.

(60) Provisional application No. 62/351,111, filed on Jun. 16, 2016, provisional application No. 62/182,381, filed on Jun. 19, 2015.

(51) Int. Cl.
| | | |
|---|---|---|
| *G02F 1/37* | (2006.01) | |
| *G02F 2/02* | (2006.01) | |
| *G02F 1/35* | (2006.01) | |
| *G02F 1/355* | (2006.01) | |

(52) U.S. Cl.
CPC ............ *G02F 1/353* (2013.01); *G02F 1/3526* (2013.01); *G02F 1/3556* (2013.01)

(58) Field of Classification Search
CPC .............................. G02F 1/3526; G02F 1/3556
See application file for complete search history.

(56) References Cited

U.S. PATENT DOCUMENTS

| | | | |
|---|---|---|---|
| 7,515,330 B2 * | 4/2009 | Bratkovski | G02F 1/37 |
| | | | 359/326 |
| 7,560,707 B2 * | 7/2009 | Bratkovski | B82Y 20/00 |
| | | | 250/458.1 |
| 9,374,887 B1 | 6/2016 | Warne et al. | |
| 9,685,765 B2 | 6/2017 | Sinclair et al. | |
| 9,733,545 B2 * | 8/2017 | Belkin | G02F 1/3556 |
| 9,865,987 B1 * | 1/2018 | Eichenfield | C03C 14/006 |
| 2017/0248831 A1 * | 8/2017 | Rodriguez | G02F 1/3501 |

OTHER PUBLICATIONS

S. V. Makarov et al., "Nanocrystalline resonant silicon nanoparticle for highly efficient second harmonic generation," 2017 Progress in Electromagnetics Research Symposium—Spring (PIERS), St Petersburg, Russia, 2017, pp. 3368-3370.*

(Continued)

*Primary Examiner* — Rhonda Peace
(74) *Attorney, Agent, or Firm* — Martin I. Finston

(57) ABSTRACT

A method of nonlinear wavelength generation uses a non-linear optical medium. An input flux of pump energy is applied to one or more dielectric optical resonators. Each resonator has an optical cavity comprising the nonlinear optical medium. Each resonator has at least one Mie resonance that is excited by the input flux of pump energy. The pump energy causes the generation of converted light containing at least one converted component having a frequency attainable only through a non-linear process.

13 Claims, 16 Drawing Sheets

(56) References Cited

OTHER PUBLICATIONS

L. A. Smirnov and A. I. Smirnov, "Second-harmonic generation by resonant high-index dielectric nanoparticles," 2017 19th International Conference on Transparent Optical Networks (ICTON), Girona, 2017, pp. 1-3.*

M. R. Shcherbakov et al., "Third-harmonic generation from silicon oligomers and metasurfaces," 2015 Conference on Lasers and Electro-Optics (CLEO), San Jose, CA, 2015, pp. 1-2.*

Camacho-Morales, R. et al., "Shaping the Radiation Pattern of Second-Harmonic Generation from AlGaAs Nonlinear Nanoantennas," Photonics and Fiber Technology Congress, 2016, 2 pages.

Camacho-Morales, R. et al., "Nonlinear Generation of Vector Beams from AlGaAs Nanoantennas," Nano Letters (2016) 16:7191-7197.

Campione, S. et al., "Tailoring the Properties of Dielectric Resonator-Based Metamaterials," 8th International Congress on Advanced Electromagnetic Materials in Microwaves and Optics—Metamaterials (2014) Copenhagen, Denmark, Aug. 25-30, 2014, 3 pages.

Campione, S. et al., "Tailoring dielectric resonator geometries for directional scattering and Huygens' metasurfaces," Optics Express (2015) 23(3):2293-2307.

Campione, S. et al., "A New Monolithic Dielectric Resonator Metasurface Design for High Quality-Factor Fano Resonances," SAND2015-7994C, Sandia National Laboratories, Metamaterials 2015, Sep. 10, 18 pages.

Campione, S. et al., "A New Monolithic Dielectric Resonator Metasurface Design for High Quality-Factor Fano Resonances," 9th International Congress on Advanced Electromagnetic Materials in Microwaves and Optics—Metamaterials 2015, Oxford, United Kingdom, Sep. 7-12, 3 pages.

Campione, S. et al., "Tailoring Dielectric Resonator Geometries for Directional Scattering, Huygens' Metasurfaces, and High Quality-Factor Fano Resonances," SAND2016-1722C, Sandia National Laboratories, 4 pages.

Campione, S. et al., "Broken symmetry dielectric resonators for high quality-factor Fano metasurfaces," SAND2016-2525J, Sandia National Laboratories, 15 pages.

Campione, S. et al., "Broken Symmetry Dielectric Resonators for High Quality Factor Fano Metasurfaces," ACS Photonics (2016) 3:2362-2367.

Celebrano, M. et al., "Mode matching in multiresonant plasmonic nanoantennas for enhanced second harmonic generation," Nature Nanotechnology (2015) 10:412-417.

Chong, K. E. et al., "Polarization-Independent Silicon Metadevices for Efficient Optical Wavefront Control," Nano Letters (2015) 15:5369-5374.

Choquette, K. D. et al., "Fabrication and Performance of Selectively Oxidized Vertical-Cavity Lasers," IEEE Photonics Technology Letters (1995) 7(11):1237-1239.

Choquette, K. D. et al., "Advances in Selective Wet Oxidation of AlGaAs Alloys," IEEE Journal of Selected Topics in Quantum Electronics (1997) 3(3):916-926.

Decker, M. et al., "High-efficiency light-wave control with all-dielectric optical Huygens' metasurfaces," Advanced Optical Materials (2015) 3:813-820.

Gili, V. F. et al., "Monolithic AlGaAs second-harmonic nanoantennas," Optics Express (2016) 24(14):15965-15971.

Ginn, J. C. et al. "Realizing Optical Magnetism from Dielectric Metamaterials", Physical Review Letters, 2012, 097402, vol. 108.

Gongora, J. S. et al., "Nonlinear emission from dark anapole modes and route to all-dielectric metamaterial near-field lasers", Photonics and Fiber Technology Congress 2016.

Hirai, Y. et al., "Characterization of the Oxide Film Obtained by Wet Oxidation of Al-Rich AlGaAs," Japanese Journal of Applied Physics (2012) 51:02BG10.

Knopp, K. J. et al., "Optical constants of $(Al_{0.98}Ga_{0.02})_xO_y$ native oxides," Applied Physics Letters (1998) 73(24):3512-3514.

Kruk, S. S. et al., "Recent advances in metasurfaces and all-dielectric nanophotonics (Conference Presentation)", Abstract View presentation recording on the SPIE Digital Library: http://dx.doi.org/10.1117/12.2236270.5159519595001 , Proc. SPIE 9918, Metamaterials, Metadevices, and Metasystems 2016, 99180Z (Nov. 9, 2016), 1 page.

Kruk, S. S. et al., "Nonlinear Optical Magnetism Revealed by Second-Harmonic Generation in Nanoantennas," Nano Letters (2017) 17:3914-3918.

Kruk, S. S. et al., "Magnetic vs Electric Second-Harmonic Generation from AlGaAs Nanoantennas," CLEO 2017, Optical Society of America, 2 pages.

Lin, D. et al., "Dielectric gradient metasurface optical elements," Science (2014) 345:298-302.

Liu, S. et al., "Realization of tellurium-based all dielectric optical metamaterials using a multi-cycle deposition-etch process," Applied Physics Letters (2013)102:161905, 4 pages.

Liu, S. et al., "Optical magnetic mirrors without metals," Optica (2014) 1(4):250-256.

Liu, S. et al., "III-IV semiconductor nano-resonators—a new strategy for passive, active, and nonlinear all-dielectric metamaterials," Physics Optics (2016) arXiv:1605-00298, 17 pages.

Liu, S. et al., "III-IV semiconductor nano-resonators—a new strategy for passive, active, and nonlinear all-dielectric metamaterials," SAND2016-4320J, Sandia National Laboratories, 13 pages.

Liu, S. et al., "2D and 3D all dielectric metamaterials made from III-V semiconductors," SAND2016-0861C, 2 pages.

Liu, S. et al., "Nonlinear Optical Metasurfaces—dielectric metasurfaces," SAND2016-2869c, Sandia National Laboratories, 26 pages.

Liu, S. et al., "Resonantly enhanced second-harmonic generation using III-V semiconductor all-dielectric metasurfaces," arXiv:1608.02570 [physics.optics], version 1 submitted Aug. 8, 2016, version 2 submitted Aug. 15, 2016, 28 pages.

Liu, S. et al., "Frequency-super-mixing in dielectric metasurfaces," CLEO 2017, Optical Society of America, 2 pages.

Marino, G. et al., "Sum-Frequency Generation and Photon-Pair Creation in AlGaAs Nano-Scale Resonators," CLEO 2017, Optical Society of America, 2 pages.

Moitra, P. et al., "Realization of an all-dielectric zero-index optical metamaterial," Nature Photonics (2013) 7:791-795.

Neshev, D. et al., "Shaping Emission Spectra of Quantum Dots by All-dielectric Metasurfaces," SAND2014-0510C, 2 pages.

Person, S. et al., "Demonstration of Zero Optical Backscattering from Single Nanoparticles," Nano Letters (2013) 13: 1806-1809.

Shalaev, M. I. et al. "High-Efficiency All-Dielectric Metasurfaces for Ultracompact Beam Manipulation in Transmission Mode," Nano Letters (2015) 15:6261-6266.

Shcherbakov, M. R. et al., "Enhanced Third-Harmonic Generation in Silicon Nanoparticles Driven by Magnetic Response," Nano Letters (2014) 14:6488-6492.

Sinclair, M., "High Quality Factor Fano Metasurfaces," SAND2015-9143A, Sandia National Laboratories, 1 page.

Sinclair, M. B., et al., "Broken Symmetry Dielectric Resonators for Scalable, High Quality-Factor Fano Metasurfaces," SAND2016-2089A, Sandia National Laboratories, 2 pages.

Sinclair, M. B., "High Quality-Factor, All-Dielectric, Fano Metasurfaces at Near Infrared Frequencies," SAND2016-2090A, Sandia National Laboratories, 1 page.

Singh, R. et al., "Ultrasensitive terahertz sensing with high-Q Fano resonances in metasurfaces," Applied Physics Letters (2014) 105:171101-1-171101-5.

Solntsev, A. S. et al., "Quantum-classical correspondence for photon-pair generation in nonlinear dielectric nano-resonators," 2016 Photonics and Fiber Technology Congress, Optical Society of America, Sep. 5-8, 2016, 2 pages.

Staude, I. et al., "Tailoring Directional Scattering through Magnetic and Electric Resonances in Subwavelength Silicon Nanodisks," ACS Nano (2013) 7(9):7824-7832.

Wang, F. et al., "Switchable and non-switchable zero backscattering of dielectric nano-resonators," Optical Materials Express (2015) 5(3):668-675.

(56) References Cited

OTHER PUBLICATIONS

Warne, L. K. et al., "Perturbation Theory in the Design of Degenerate Rectangular Dielectric Resonators," Progress in Electromagnetics Research B (2012) 44:1-29.

Warne, L. K. et al., "Perturbation Theory in the Design of Degenerate Spherical Dielectric Resonators," IEEE Transactions on Antennas and Propagation (2013) 61(4):2130-2141.

Wolf, O. et al., "Enhanced optical nonlinearities in the near-infrared using III-nitride heterostructures coupled to metamaterials," Applied Physics Letters (2015) 107:151108-1-151108-5.

Wu, C. et al., "Fano-resonant asymmetric metamaterials for ultrasensitive spectroscopy and identification of molecular monolayers," Nature Materials (2011)11:69-75.

Wu, C. et al., "Spectrally selective chiral silicon metasurfaces based on infrared Fano resonances," Nature Communications (2014) 4892, 9 pages.

Yang, Y. et al., "All-dielectric metasurface analogue of electromagnetically induced transparency," Nature Communications (2014) 6753, 7 pages.

Yang, Y. et al., "Nonlinear Fano-Resonant Dielectric Metasurfaces," Nano Letters (2015) 15:7388-7393.

Yang, Y. et al., "Electrochemical dynamics of nanoscale metallic inclusions in dielectrics," Nature Communications (2014) 5232, 9 pages.

Zhao, W. et al., "Fano resonance in all-dielectric binary nanodisk array realizing optical filter with efficient linewidth tuning," Optics Express (2015) 23:6858-6866.

\* cited by examiner

NONLINEAR OPTICAL FREQUENCY CONVERSION USING METAMATERIAL ARRAYS

CROSS-REFERENCE TO RELATED APPLICATIONS

This application claims the benefit of U.S. Provisional Application No. 62/351,111, filed Jun. 16, 2016, the entirety of which is hereby incorporated herein by reference.

This application is a continuation-in-part of U.S. application Ser. No. 15/184,929 filed by Sheng Liu et al. on Jun. 16, 2016 under the title "Optoelectronic Apparatus Enabled by Dielectric Metamaterials", the entirety of which is hereby incorporated herein by reference.

The abovesaid U.S. application Ser. No. 15/184,929 claims the benefit of the earlier filing date of U.S. Provisional Patent Application No. 62/182,381, filed Jun. 19, 2015, titled "Optoelectronic Apparatus Enabled by Dielectric Metamaterials".

STATEMENT OF GOVERNMENT RIGHTS

This invention was developed under Contract DE-AC04-94AL85000 between Sandia Corporation and the U.S. Department of Energy and under Contract DE-NA0003525 awarded to National Technology & Engineering Solutions of Sandia, LLC by the United States Department of Energy/National Nuclear Security Administration. The U.S. Government has certain rights in this invention.

FIELD OF THE INVENTION

The invention relates to optical devices, and more particularly to optical devices that utilize metamaterials.

ART BACKGROUND

Nonlinear optics is the study of how intense laser light interacts with optical materials. Nonlinear optical processes typically generate coherent photons with new frequencies and wavelengths. Hence one benefit is access to spectra that are not available using conventional lasers.

Bulk nonlinear crystals (generally, crystals that are hundreds of micrometers to several millimeters in their spatial dimensions) have been widely used for nonlinear optical processes such as second harmonic generation, third harmonic generation, sum frequency generation, difference frequency generation, and the like. Despite the wide availability of nonlinear crystals, there are demands for more compact structures to realize high efficiency nonlinear processes. Moreover, traditional nonlinear optical processes using bulk crystals require phase matching between the fundamental frequencies and new generated frequencies.

Generally, the use of uniaxial or biaxial bulk nonlinear crystals, or the application of quasi-phase matching techniques, is required in order for the interacting optical fields to meet the strict phase-matching conditions.

Recently, however, advances in nanostructured optical materials, plasmonics, and metasurfaces have enabled nonlinear optical processes that do not depend on phase matching. These approaches create tight confinement and large resonant enhancement of electromagnetic fields, which generate much higher nonlinear efficiencies than in the constituent materials.

Moreover, metasurfaces comprising arrays of Mie dielectric resonators have attracted recent attention at optical frequencies due to their much lower loss compared with their metallic counterparts. In particular, silicon has been used extensively as the constituent material for all-dielectric metamaterials that have been used for a variety of applications including high efficiency Huygens metasurfaces, beam steering, ultra-thin waveplates, zero-index directional emission and polarization insensitive holograms.

In the last few years, it was realized that dielectric nanoresonators can also be used to greatly enhance nonlinear optical phenomena, due to the largely enhanced electromagnetic fields inside the resonators and the larger mode volume. However, due to the centrosymmetric crystal structure of silicon, second-order nonlinear optical phenomena were not observed in silicon-based metasurfaces.

Therefore, there has been a need for dielectric metasurfaces based upon other materials that exhibit an intrinsic second order nonlinear susceptibility ($\chi^{(2)}$) for fuller exploitation of this approach for enhanced harmonic generation and other second-order nonlinear phenomena.

SUMMARY OF THE INVENTION

Nanoscale resonators made from III-V semiconductors can fulfill these requirements.

We have demonstrated resonantly enhanced second-harmonic generation (SHG) using dielectric metasurfaces that are made from gallium arsenide (GaAs) which possesses a large intrinsic second-order nonlinearity of $d_{14}$~200 pm/V. We observed the second-harmonic (SH) response from GaAs nano-resonator arrays over a broad spectral range that encompasses both their electric and magnetic dipole resonances.

At both resonances, we observed enhanced SHG that is orders of magnitude stronger than the SHG from unpatterned bulk GaAs. Most interestingly, the conversion efficiency at the magnetic dipole resonance was about 100 times higher than the conversion efficiency at the electric dipole resonance. This was attributed, in part, to the increased absorption of GaAs at the shorter wavelength of the electric dipole resonance.

We also observed that the polarization of the SHG at the magnetic dipole resonance was orthogonal to the polarization expected of an SHG process mediated by the bulk nonlinearity of GaAs, suggesting an important role of surface nonlinearities in this class of dielectric metasurfaces.

Our investigations not only improved our understanding of nonlinear optical processes in these nanostructured materials, but also highlighted the opportunities for nonlinear frequency up- and down-conversion without phase-matching, as well as entangled photon pair generation.

We have developed ultra-compact nanostructures that require no phase matching condition and can perform nonlinear processes with high efficiencies. The nanostructures consist of single- or multi-layer arrays of dielectric resonators made of semiconductors with high nonlinear coefficients. (Below, we also refer to the resonator structures as "microresonators" or "nanoresonators". These terms, as well as the term "resonators" in the present context, are to be understood as equivalent.)

More specifically, we contemplate using III-V semiconductors with non-centrosymmetry and high nonlinear coefficients. Suitable wafers can be epitaxially grown using MOCVD, MBE, or the like, and the nanostructures can then be defined by standard lithography techniques.

The nonlinear optical processes are performed around resonances of the semiconductor nanostructures where the optical field is much enhanced.

Due to this large enhancement inside the semiconductor resonators, the efficiency of the nonlinear optical processes is largely increased. Moreover, the ultra-small dimensions of each resonator eliminate the need for phase matching.

Accordingly, an embodiment of the invention is a method of nonlinear wavelength generation. An input flux of pump energy is applied to one or more dielectric optical resonators. For example, a plurality of nominally identical such resonators may be deployed in an array to which the pump energy is applied. "Nominally identical" means identical to within manufacturing tolerances. Each resonator has an optical cavity comprising a nonlinear optical medium, and has at least one Mie resonance that is excited by the input flux of pump energy. Application of the pump energy causes the generation of converted light containing at least one converted component having a frequency attainable only through a non-linear process. A beam of output light comprising the at least one converted component is collected from the one or more dielectric resonators.

In some embodiments, the nonlinear optical medium is a bulk material. In other embodiments, it comprises a semiconductor host and a quantum well multilayer embedded in the semiconductor host.

In embodiments, the at least one Mie resonance comprises a magnetic dipole resonance or an electric dipole resonance or both types of resonance. The resonators may also have resonances of higher order than the electric and magnetic dipole resonances. Accordingly, the at least one Mie resonance in some embodiments may comprise at least one of the higher order resonances.

In embodiments, the method is performed for nonlinear wavelength conversion, and the input flux of pump energy comprises at least one input beam of electromagnetic radiation having a frequency f. The input beam is impinged onto the one or more dielectric optical resonators, thereby to generate converted light containing at least one converted component having a frequency unequal to f. The at least one Mie resonance of each of the dielectric optical resonators is excited by the input beam. For example, a single input beam may be used to generate a harmonic or a harmonic series of the pump frequency f by a process of harmonic generation. A "harmonic series" is a plurality of harmonics of different orders, such as second harmonic, third harmonic, etc.

In embodiments, the input beam comprises two beams which may be arbitrarily denominated a "pump" beam and a "signal" beam. The converted light is generated from the pump and signal beam by sum frequency generation, difference frequency generation, four-wave mixing, five-wave mixing, six-wave mixing, or some combination of these processes.

In embodiments, converted light is generated from a pump beam by spontaneous parametric down-conversion.

In embodiments, the nonlinear optical medium has a transition energy, and the converted light is generated from the pump beam by a process of two-photon emission with emitted photon energies that are less than the transition energy. In embodiments, a quantum well multilayer embedded in a semiconductor host comprised by the nonlinear optical medium supports at least one inter-subband transition, and the inter-subband transition provides the nonlinear optical medium transition energy.

In embodiments, a pump beam and a signal beam each excite a respective Mie resonance of the one or more dielectric optical resonators.

In embodiments, the one or more dielectric optical resonators have at least two Mie resonances, one said Mie resonance is excited by the input beam, and at least one other Mie resonance is excited by the at least one converted component.

In embodiments, the at least one input beam comprises a pump beam of frequency f, the generating converted light comprises photoluminescence whereby the converted light contains a spectrum of converted components, and the converted components in the photoluminescence spectrum have at least some frequencies that are greater than the pump frequency f.

In embodiments, the input flux of pump energy is an electric current and the nonlinear process is two-photon emission, or spontaneous parametric down-conversion, or both two-photon emission and spontaneous parametric down-conversion.

DESCRIPTION

Optical metamaterials are structures that interact with electromagnetic radiation through geometrical features whose spatial scale is comparable to the wavelength of the interacting visible, infrared, or microwave radiation. These materials are currently the subject of intense interest because of their many potential applications in the modification and control of optical and microwave signals.

As research on optical metamaterials progresses, new effects with potentially useful applications continue to be discovered. For example, we recently found a surprising enhancement in the predicted confinement of the resonant electric field within the resonator. This result arose from computer modeling of metamaterial structures. In an example described below, the structures include gallium arsenide (GaAs) and aluminum gallium arsenide (AlGaAs) layers grown on a GaAs substrate.

In an example, the initial workpiece for forming a GaAs—AlGaAs optical metamaterial is a layered structure consisting of a GaAs substrate overlain by 400 nm of epitaxially grown AlGaAs, followed by 300 nm of epitaxially grown GaAs. The aluminum in the AlGaAs layer is oxidized to AlGaO to reduce the refractive index of that layer to a value significantly below the refractive index of GaAs. (AlGaO is an aluminum-gallium oxide. Stoichiometric coefficients are not provided here because the precise composition may be variable.) That is, the refractive index of the native alumina produced in this manner is about 1.6, whereas GaAs has an index greater than 3.0 at typical near-infrared wavelengths. This has the desirable effect of confining the optical intensity profile (corresponding to the resonant optical modes) within the resonators.

The workpiece is patterned and etched down to the top of the oxidized AlGaAs layer to form an array of cylinders formed with sub-wavelength dimensions, e.g. a diameter and height of several hundred nanometers for performance at 1-2 µm optical wavelength.

Figure 1:
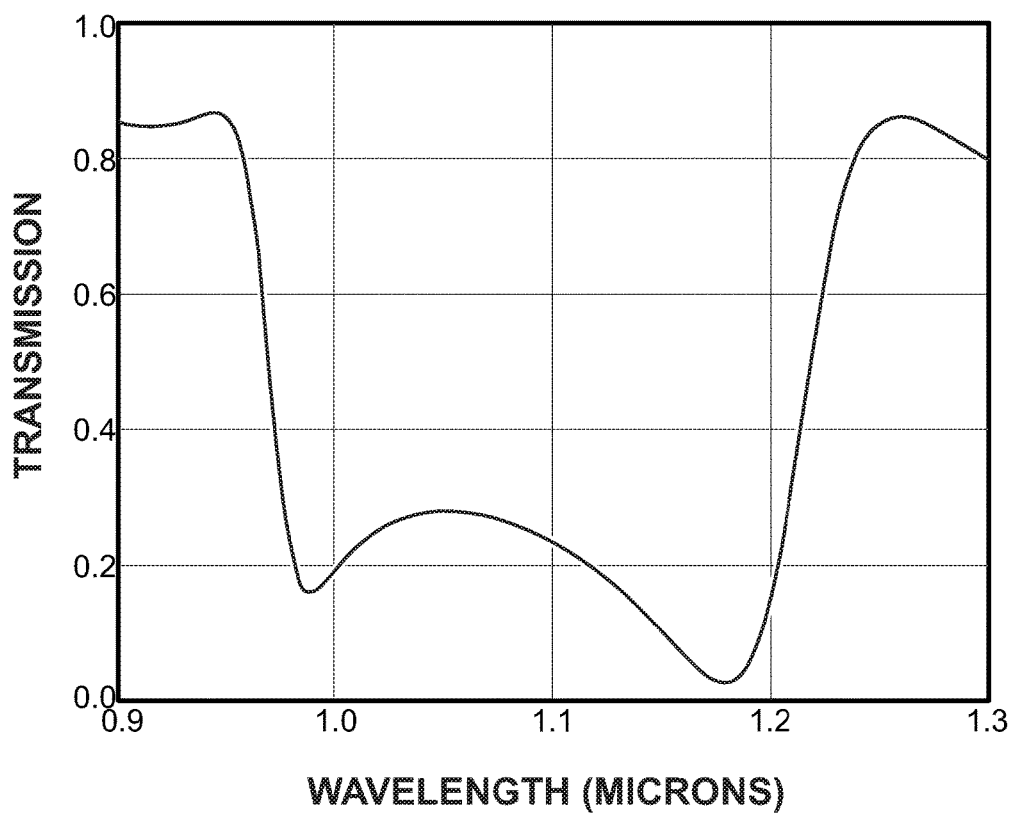
FIG. 1 is a theoretical transmission spectrum, obtained from simulations, of an array of cylindrical resonant structures formed in the shape of circular cylinders. Our studies predict that arrays of such resonators can exhibit enhanced optical properties, even without neighbor interactions or Fano resonances, when the resonator structures are made with sub-wavelength dimensions. It will be seen that there are resonances at about 980 nm and about 1170 nm.

FIG. 1 is the theoretical transmission spectrum, obtained from simulations, of an array of resonant structures of the kind described above. It will be seen that there are resonances at about 980 nm and about 1170 nm.

Figure 2:
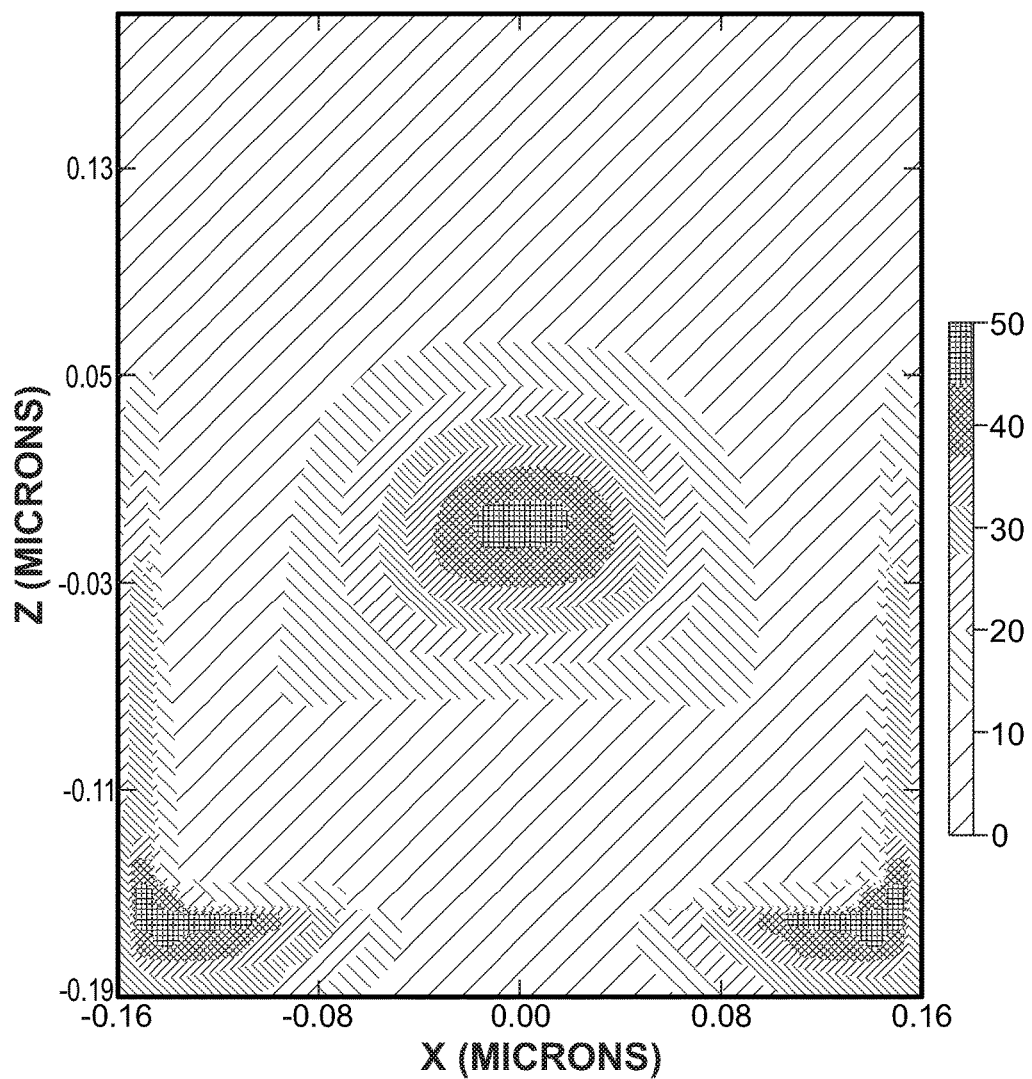
FIGS. 2 and 3 are theoretical two-dimensional contour plots, obtained from computational simulations, of the electric field intensity within a resonator of the array of FIG. 1 at respective excitation wavelengths of about 980 nm and about 1170 nm.
Figure 3:
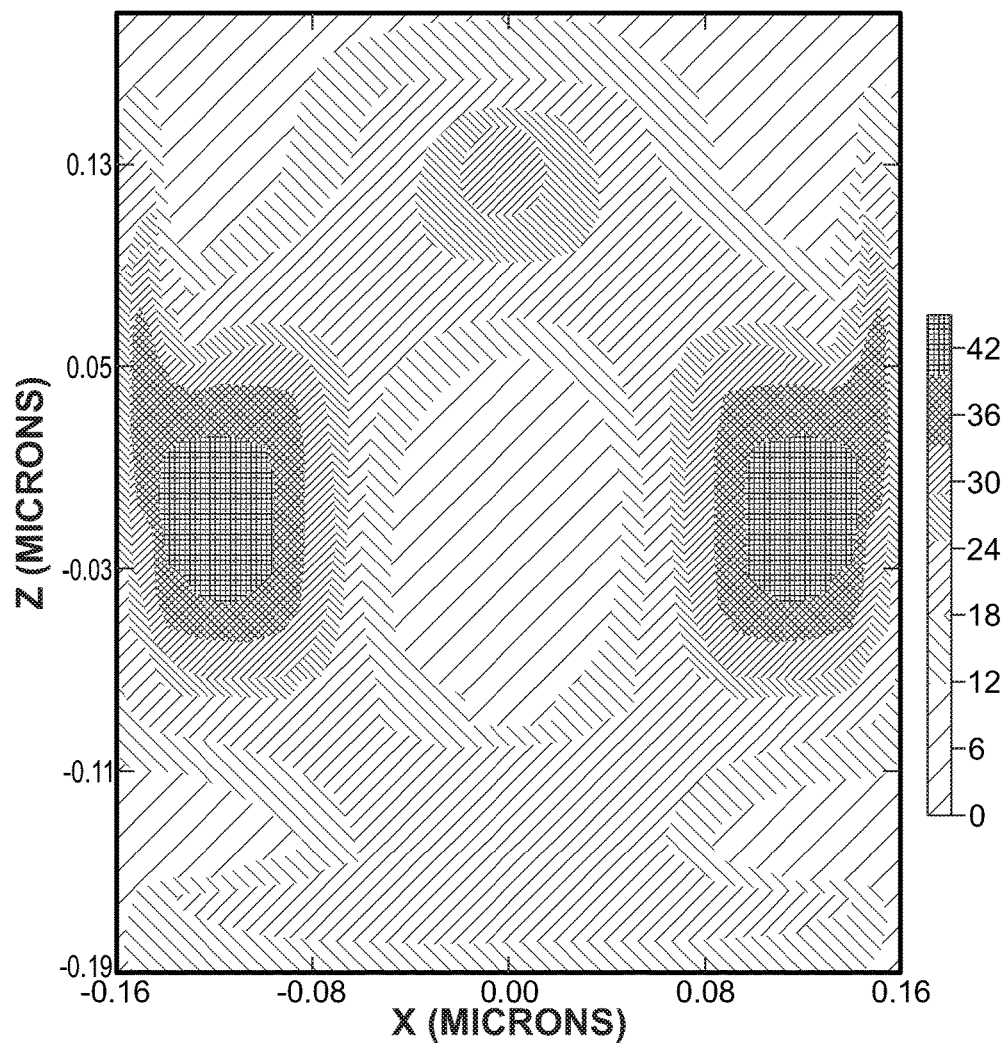

The enhancement in the electric field intensity within the resonator structure can be seen in FIGS. 2 and 3. FIG. 2 is a theoretical two-dimensional contour plot, obtained from simulations, of the electric field intensity within the resonator at about 980 nm. FIG. 3 is a similar two-dimensional contour plot of the electric field intensity within the resonator at about 1170 nm. The internal field is higher than the incident field because of the quality factor of the magnetic and electric dipole resonances of the structure.

In another example, the initial workpiece is patterned so as to achieve Fano resonances, which characteristically have extremely narrow spectral widths. These resonances are believed to arise because of coupling between the different dipole modes of the dielectric blocks that constitute the individual resonators, as will be explained below. Modeling studies predict that Fano-resonant metamaterials can be designed to exhibit not only the internal field enhancements described above, but also transmission and reflection spectra that have extremely narrow features.

Figure 4:
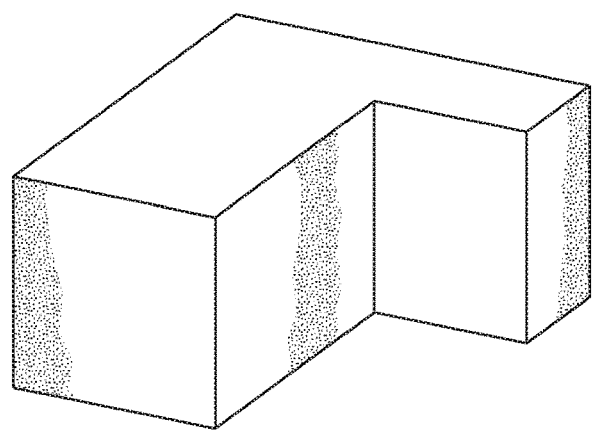
FIG. 4 is a sketch, not to scale, of a shape for a resonator that includes an asymmetric feature effective for coupling of different modes. In the figure, the asymmetric feature is a cutout corner. Such a shape can be useful for producing resonator arrays that exhibit Fano resonance.

FIG. 4 is an example of a resonator structure designed to exhibit a Fano resonance when replicated as a unit cell in a two-dimensional array. By way of example, the structure shown in FIG. 4 is a cube from which a corner has been cut out. The cutout extends through the entire thickness of the cube, and it has a length and width that are each one-half the side length of the cube. It should be noted that this example is non-limiting. Various other dimensions, as well as various other shapes, may also be effective for producing useful Fano resonances.

The width, length and height dimensions of the resonator structure will typically be the designed Fano wavelength divided by the refractive index, so that the spatial dimensions are all less than the vacuum wavelength. However, larger dimensions can also be useful when excitation at higher-order resonant modes is desired.

Intersubband transitions (ISTs) are useful for enhancing nonlinear optical effects due to their giant nonlinear optical susceptibilities. ISTs are also useful for providing sub-bandgap transitions that can participate in the nonlinear process known as two-photon emission (TPE). One useful way to provide ISTs is to add a quantum well multilayer to a host semiconductor.

Figure 5:
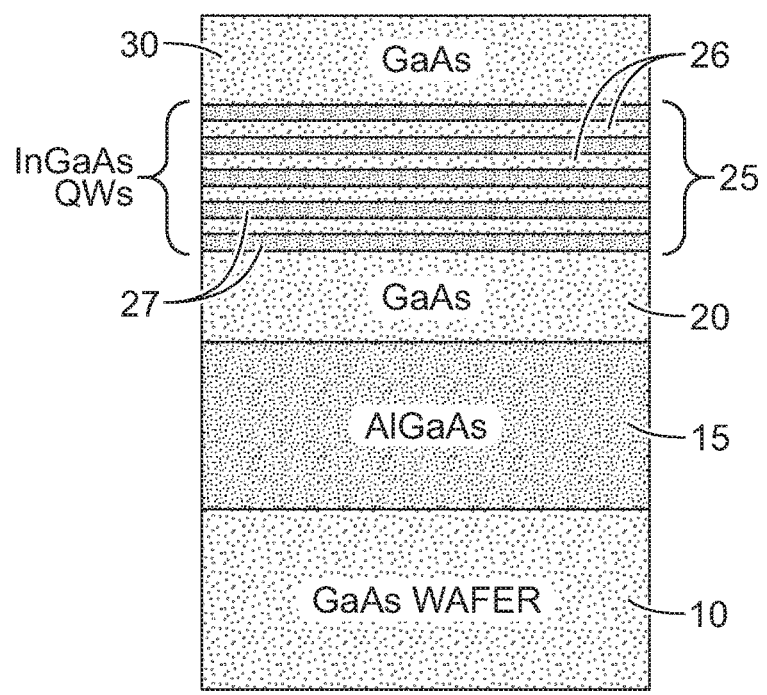
FIG. 5 is a schematic diagram of a layered resonator structure in which the active medium comprises a quantum well multilayer, according to an embodiment of the invention.

FIG. 5 provides an example of a resonator structure that incorporates a quantum well multilayer.

In the example of FIG. 5, a multilayer of indium gallium arsenide (InGaAs) quantum wells is formed in a gallium arsenide host on a gallium arsenide substrate. Quantum well multilayers useful in the present context can also be implemented in a variety of other material systems. One example uses indium gallium arsenide phosphide (InGaAsP) multilayers on an indium phosphide (InP) substrate. In such a layer, InGaAsP wells in which the alloy composition is adjusted to provide a lower bandgap are alternated with InGaAsP barrier layers in which the alloy composition is adjusted to provide a higher bandgap.

A significant feature of confinement-type structures such as quantum well and quantum dot multilayers is that they often support optical transitions of lower energies than the bandgap of the host material. In the quantum well multilayer of FIG. 5, for example, the resonant transitions due to the InGaAs quantum wells will typically have wavelengths longer than the wavelength associated with bandgap-energy transitions in the gallium arsenide host.

Accordingly, the resonator body can for some purposes be dimensioned to support resonance at one or more wavelengths associated with transitions in a gain medium such as a quantum well multilayer, without supporting resonance at the shorter wavelength associated with the host band-gap energy, where undesirable optical loss might occur.

With further reference to FIG. 5, it will be seen there that a layered structure consists of a GaAs substrate 10 overlain in sequence by 300 nm layer 15 of AlGaAs, base layer 20 of approximately 100 nm of GaAs, a quantum well multilayer 25 of five periods of InGaAs quantum wells (QWs), and a cap layer 30 of GaAs approximately 100 nm thick. Two-dimensional arrays of metamaterial resonators can be fabricated in this structure using standard lithographic processes. For operation in the near infrared, example resonator structures are cylinders or modified cubes or the like having lateral dimensions of several hundred nanometers.

The 100-nm base layer 20 of GaAs forms the lower half of the resonator. The quantum-well multilayer 25 forms the middle portion of the resonator, and the upper 100-nm cap layer 30 of GaAs forms the upper half of the resonator.

Each quantum-well period consists of one layer 26 of GaAs and one layer 27 of InGaAs. The III-V layers are deposited by, e.g., MOCVD or MBE. The layer thicknesses are typically in the range 1-20 nm, but may be varied according to known principles in order to achieve desired effects. The resonator structures can be defined by a standard lithographic process flow such as electron-beam patterning and development, followed by metal deposition, lift-off, and dry etching. For longer operating wavelengths, e.g. mid-infrared wavelengths, photolithography can be used. The etch will typically extend all the way to the surface of the GaAs substrate 10, but it can optionally stop at the top of the 300-nm AlGaAs layer 15 or within that layer.

In embodiments, it is advantageous for the 300-nm-thick AlGaAs layer 15 to have a high aluminum mole fraction, for example a mole fraction greater than 80%. The aluminum can be oxidized to alumina (i.e., in AlGaO as explained above) to reduce the refractive index of layer 15 to a value significantly below the refractive index of GaAs. This has the desirable effect of confining the optical intensity profile (corresponding to the resonant optical modes) within the resonators.

Oxidation of AlGaAs is described, for example, in Kent D. Choquette et al., "Advances in Selective Wet Oxidation of AlGaAs Alloys", *IEEE J. Sel. Topics in Quant. Electr. Vol.* 3, No. 3 (June 1997) 916-926, the entirety of which is hereby incorporated herein by reference. Briefly, the oxidation is a one-step process in which the samples are introduced to an oxidation furnace where several gases flow through the samples at high temperature. Complete oxidation of the AlGaAs is effective for achieving the desired mode confinement. Simulations indicate that partial oxidation can also be effective.

In alternative material systems in which the oxidation step is not feasible, similar optical confinement can be achieved using flip-chip attachment. A known method of flip-chip attachment is described, for example, in the article S. Person et al., "Demonstration of Zero Optical Backscattering from Single Nanoparticles," *Nano Letters* 13 (2013) 1806-1809. In the work reported there, an epitaxial lift-off technique was used in conjunction with a wafer-bonding procedure to attach a high quality GaAs membrane, which was grown on a gallium arsenide substrate, to a fused silica substrate. For that work, directly growing gallium arsenide on fused silica was disfavored because it would create a high density of dislocations.

In other examples of flip-chip attachment, assembly is by well-known processes, using a thin layer of adhesive or other material to adhere the confinement substrate to the resonator substrate.

Methods of flip-chip attachment would be desirable, for example, when it is desired to layer a semiconductor structure over a low-index substrate such as glass or sapphire.

Figure 6:
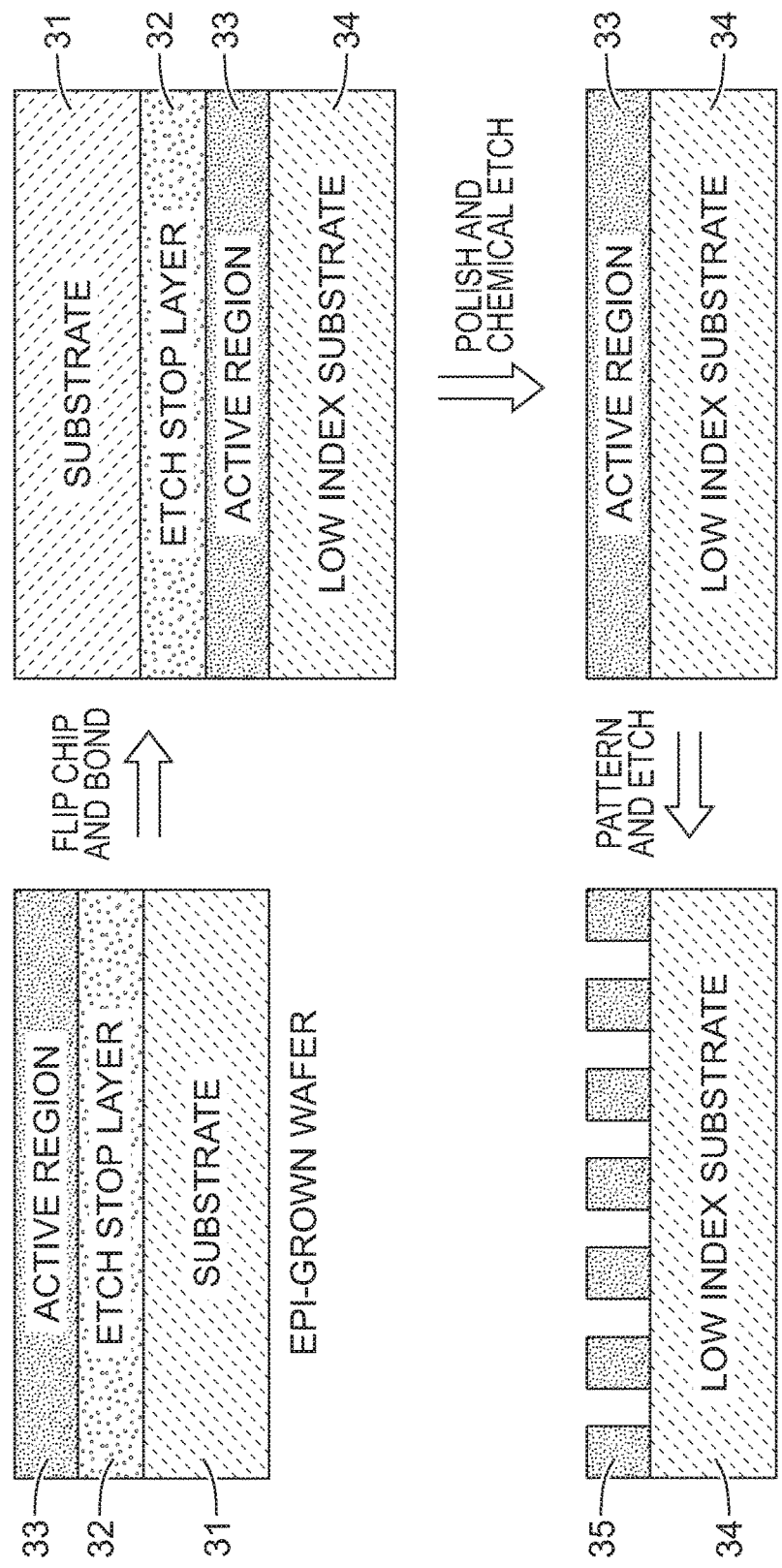
FIG. 6 is a flowchart containing sequential, schematic cross-sectional views that illustrate a flip-chip method of assembling a resonant array. The illustrated method is useful when, e.g., in-situ oxidation to produce an optical confinement layer is not feasible.

FIG. 6 illustrates another method of flip-chip attachment. As seen in the figure, an epitaxially grown starting wafer includes a substrate 31, an etch-stop layer 32, and an active region 33. A low-refractive index substrate 34 is provided for use as the optical confinement layer and also as a handle for the active region. Low-index substrate 34 is flip-chip bonded to the top of the starting wafer, i.e., to the face of active region 33 distal substrate 31. For the purpose of bonding, a thin adhesion layer may be added. Substrate 31 and etch-stop layer 32 are removed from the assembly by polishing and chemical etching. Active region 33 is then patterned and etched to produce the desired resonator structures 35. For clarity of presentation, several steps have been omitted from this discussion. Various procedures for the omitted steps are conventional and will be known to those skilled in the art.

Figure 8:
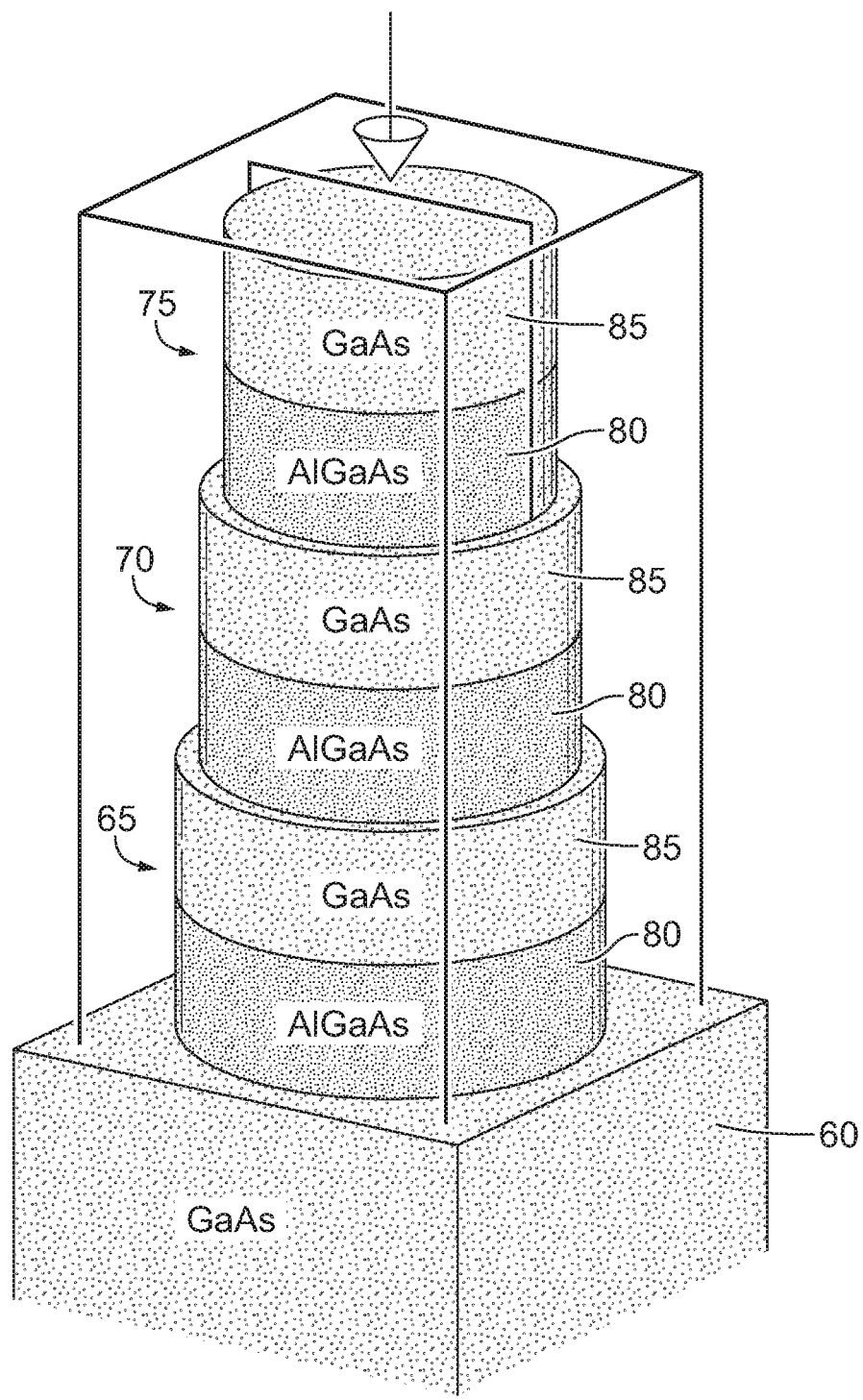
FIG. 8 is a notional perspective drawing of a unit cell of a three-dimensional resonant array in which three resonator structures are epitaxially grown in a stack.

Turning back to FIG. 5, it should be noted that the base layer 20, described above as consisting of GaAs, can alternatively be composed of AlGaAs having a low aluminum concentration. The precise mole fraction of aluminum is not critical, provided that when the 300-nm-thick AlGaAs layer 15 is oxidized, the base layer will oxidize much more slowly. This is achievable because the rate of oxidation varies exponentially with the aluminum concentration. Reference is made, in this regard, to FIG. 8 of the paper by Kent D. Choquette et al. cited above.

The oxidative procedure described above and the process of flip-chip described above are non-limiting examples of processes that be useful for providing an optical confinement layer that has a lower refractive index than the constituent materials of the array of dielectric resonators.

It is important to note that similar structures can be created in other III-V material systems such as InAs, InP, InSb, GaSb, and various III-nitrides, as well as in II-VI material systems. It is also important to note that the multilayer dielectric resonator structures (both III-V and II-VI) can be fabricated directly on CMOS-compatible silicon substrates, because the resonators have ultra-small lateral dimensions and can accommodate the strain associated with the lattice mismatch. This provides one potential solution to the difficulties of incorporating light sources onto silicon wafers.

Figure 7:
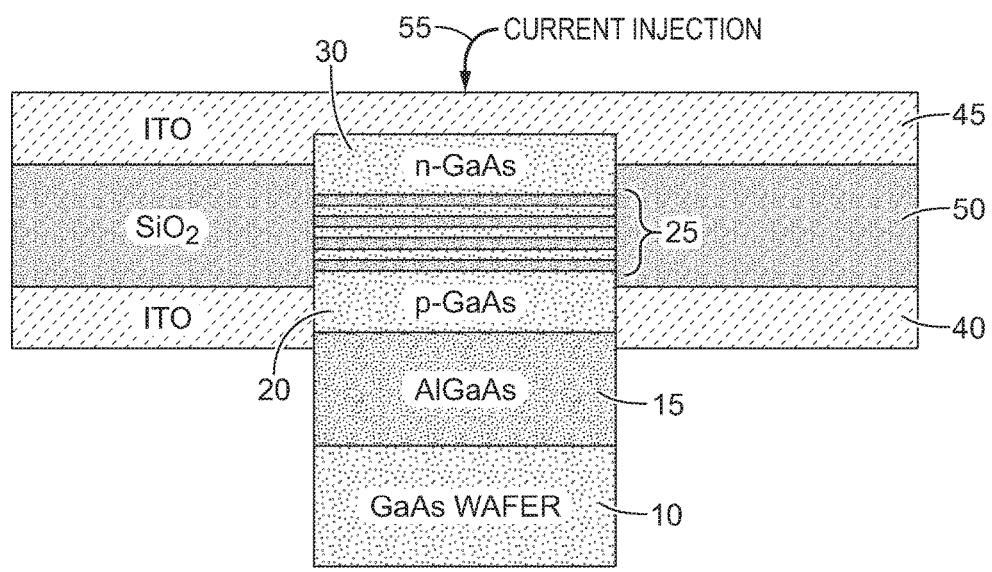
FIG. 7 is a notional diagram in which an overlying structure is added to the layered resonator structure. The overlying structure includes electrical contact layers and can be used for current injection or current extraction. The term "overlying" as used here indicates a relative position only.

FIG. 7 provides a schematic diagram illustrating an overlying structure that can be used for current injection into the multilayer resonant structures in order to energize them. Two-photon emission, for example, can be produced by an electrically driven process as well as by optical pumping. Spontaneous parametric down-conversion can also be produced by an electrically driven process as well as by optical pumping.

In an example, the GaAs cap layer 30 overlying the multiple-quantum-well (MQW) active region 25 is doped n-type and the GaAs layer 20 lying below the MQW active region is doped p-type. Because refractive index contrast is needed to preserve the mode confinement in the resonator structure, it is advantageous to use a layer of indium tin oxide (ITO), which has a refractive index of 1.31 at a wavelength of 1 μm, for both the p-type contacts 40 and the n-type contacts 45. A dielectric layer 50 of, e.g., silicon oxide is interposed between the two ITO contact layers.

Arrow 55 in FIG. 7 indicates a direction of current injection, utilizing the ITO contact layers, for operation as, e.g., a photo-emissive device.

Although the preceding discussion has been directed to two-dimensional arrays of resonators, it should be understood that three-dimensional arrays are also feasible and within the scope of the present invention. Using epitaxial growth techniques, columns can be fabricated in which two or more resonator structures are stacked one above the other.

FIG. 8 provides an example of such a column. As seen in the figure, a gallium arsenide substrate 60 is overlain by a column consisting of bottom resonator 65, middle resonator 70, and top resonator 75. Each of the three resonators includes an AlGaAs base layer 80 and a GaAs active layer 85. Although not shown in the figure, each GaAs active layer may be a host layer that contains a quantum-well multilayer as described above.

Fabrication of GaAs Two-Dimensional Arrays

We fabricated GaAs two-dimensional dielectric resonator arrays using a combination of high-aspect-ratio etching and selective wet oxidation of AlGaAs under-layers to form a low refractive index oxide, i.e. native $(Al_xGa_{1-x})_2O_3$ having a refractive index of about 1.6. As explained below, we used the same fabrication processes to demonstrate three-dimensional GaAs dielectric resonator arrays.

Our selective wet oxidation technique was adapted from a technique previously reported for forming current-blocking layers in vertical-cavity surface-emitting lasers. The earlier technique was reported, e.g., in the paper by K. D. Choquette et al., cited above.

Figure 9:
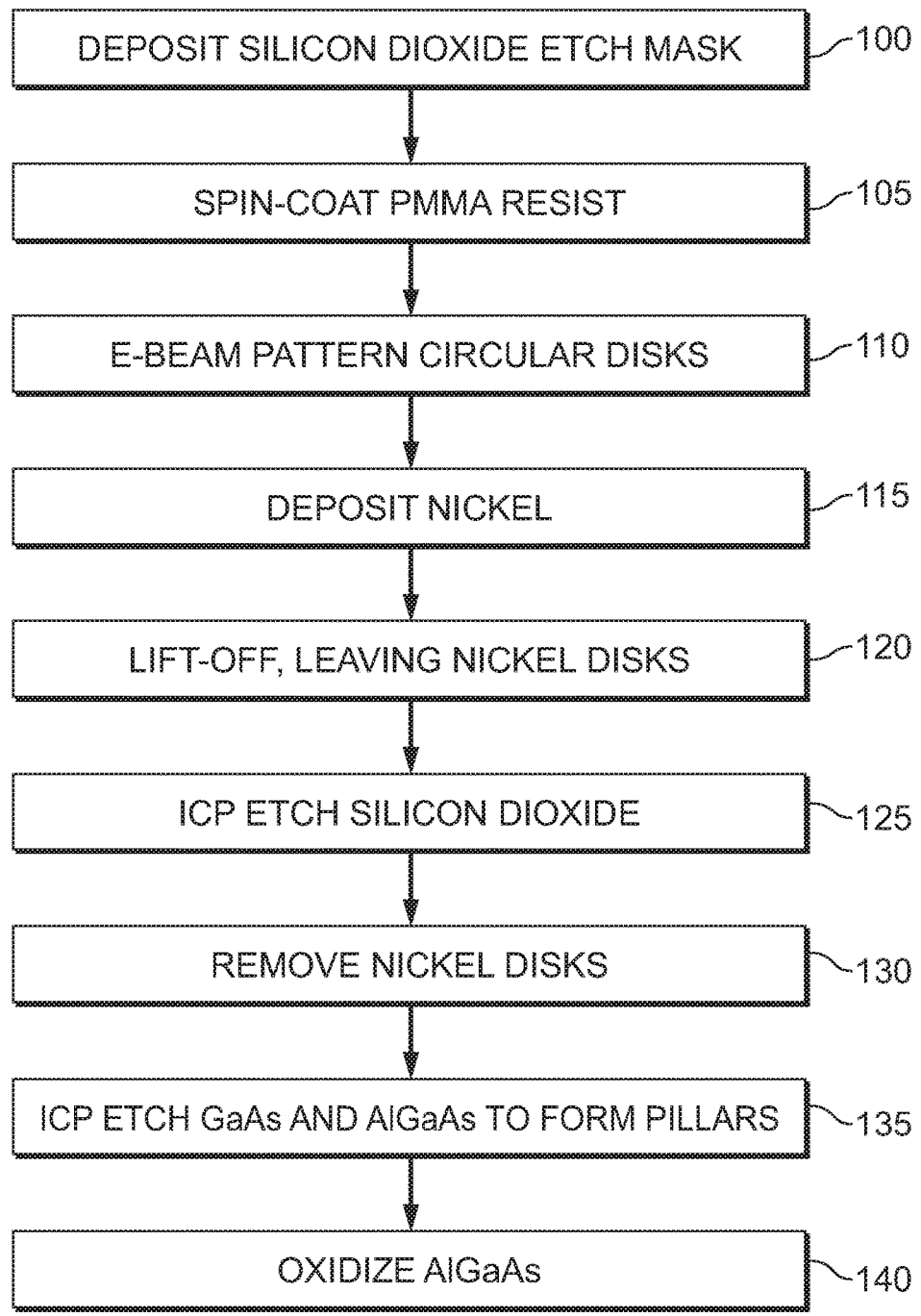
FIG. 9 is a flowchart of a process for creating an array of gallium arsenide resonators, starting from a multilayer wafer.

FIG. 9 shows the process flow for creating GaAs resonators starting from a wafer, grown by molecular beam epitaxy (MBE), that consisted of a semi-insulating GaAs substrate onto which a 300-nm layer of $Al_{0.85}Ga_{0.15}As$ was deposited followed by a 300 nm layer of GaAs.

At step 100, we deposited a few hundred nanometers of silicon dioxide ($SiO_2$) to use as an etch mask. At step 105, we next spin-coated a positive tone polymethyl methacrylate (PMMA) resist. At step 110, we patterned circular disks using standard electron-beam lithography.

At step 115, after the development of the PMMA, a 10-20 nm layer of nickel was deposited. At step 120, this was followed by a lift-off process resulting in thin nickel disks. At step 125, the shape of the nickel disks was transferred onto the $SiO_2$ layer using inductively-coupled-plasma (ICP) etching. At step 130, the nickel disks were then removed using nitric acid, leaving only the $SiO_2$ disks as an etch mask for GaAs. Silicon dioxide was desirable for use as an etch mask because under the chlorine-based ICP etch that we used in the following step, silicon dioxide etches more than five times more slowly than GaAs or AlGaAs.

At step 135, we used an optimized, chlorine-based ICP etch recipe to create pillars of GaAs and AlGaAs having smooth vertical side walls. At step 140, the workpiece was placed in a tube furnace at about 420° C. for selective wet oxidization of the AlGaAs layers. A nitrogen carrier gas was used to transport water vapor across the sample, converting the layers of AlGaAs into their native oxide, i.e., low-index $(Al_xGa_{1-x})_2O_3$.

In a modified version of the process of FIG. 9, we used an etch mask of hydrogen silsesquioxane (HSQ) in place of PMMA and silicon dioxide. This was a simpler process that produced similar results to the process of FIG. 9. In the modified process, steps 100 and 115-130 were omitted. Instead, HSQ instead of PMMA was deposited by spin coating at step 100. At step 110, we patterned circular disks in the HSQ using standard electron-beam lithography. The rest of the process was as described above. The HSQ that we used was Fox® 16 Flowable Oxide from the Dow Corning corporation. The thickness of the HSQ layer affects the etch depth that can be achieved. At the viscosity of undiluted HSQ, we deposited a layer of HSQ about 300 nm thick, which allowed an etch depth of about 3 μm.

It should be noted that the GaAs resonator layers 160 can be replaced with AlGaAs layers, provided the aluminum concentration of the resonator layers is at least about 20% lower than that of the oxidation layers 155. The oxidation rate increases exponentially with aluminum concentration, hence if the aluminum concentration in resonator layer 160 is low enough, that layer will remain mostly unchanged while the underlayer is completely oxidized.

An AlGaAs dielectric resonator layer 160 has beneficial applications because it can provide Mie resonances in the visible spectrum. That is, $Al_{0.45}Ga_{0.55}As$ has a direct bandgap at 624 nm, but it transitions into an indirect bandgap material when the aluminum concentration exceeds 45%.

Our fabrication technique, including the oxidation step, can be applied to other aluminum-containing semiconductors, such as aluminum indium arsenide and aluminum indium gallium phosphide.

More information about our fabrication method and designs may be obtained from the article, Sheng Liu et al., "III-V semiconductor nano-resonators-a new strategy for passive, active, and nonlinear all-dielectric metamaterials," published online at arXiv:1605.00298 [physics.optics] (2016), the entirety of which is hereby incorporated herein by reference for all purposes.

We believe that the flip-chip methods described above will also be useful for fabricating dielectric resonator arrays of GaAs and other materials.

Fabrication of Multilayer Arrays

As mentioned above, fabricating three-dimensional dielectric metamaterials is possible using the techniques described here. By "three dimensional" structures we mean stacked multilayer structures (which are sometimes referred to as "quasi-three-dimensional"), as well as other kinds of structures that repeat in the direction perpendicular to the substrate.

To demonstrate the ability to produce multilayer dielectric resonator arrays, we fabricated monolithic arrays of columns on a GaAs substrate, in which each column contained three instances of the $(Al_xGa_{1-x})_2O_3$—GaAs pattern described above in Example 1. That is, the sequence of layers in each column, from the bottom up, was GaAs/(Al$_x$Ga$_{1-x}$)$_2$O$_3$/GaAs/(Al$_x$Ga$_{1-x}$)$_2$O$_3$/GaAs/(Al$_x$Ga$_{1-x}$)$_2$O$_3$/GaAs. Our fabrication process was as described above, except that the initial wafer had three layers of GaAs separated by three layers of AlGaAs.

Figure 10:
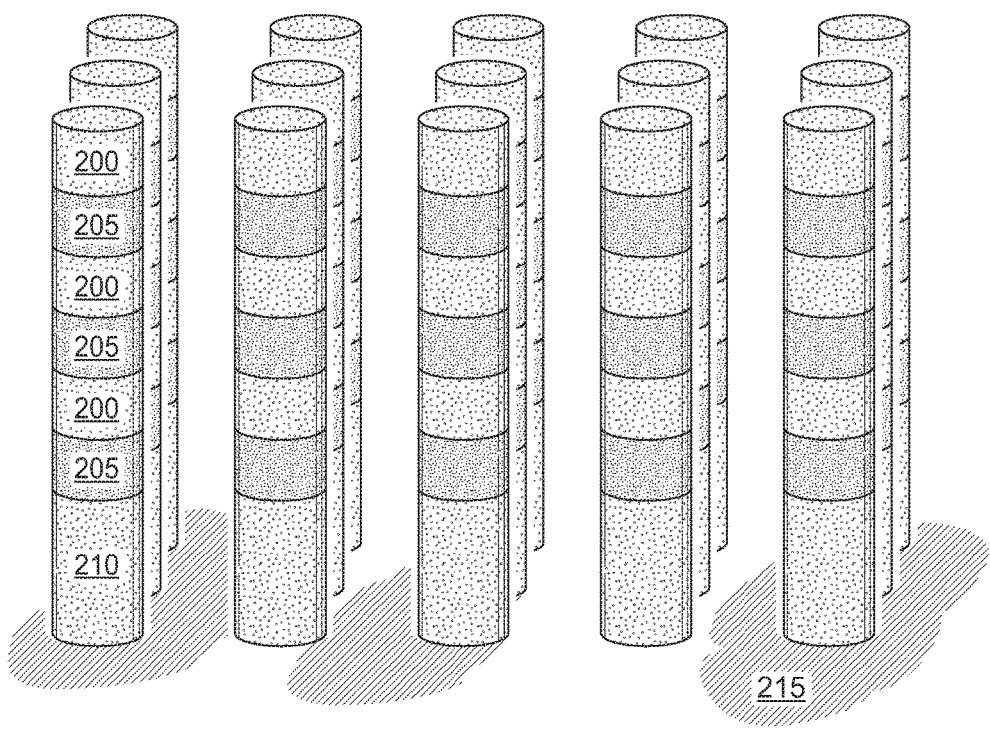
FIG. 10 provides a view, based on a scanning electron microscope (SEM) image, of an example three-dimensional resonator array fabricated according to methods described here.

FIG. 10 provides a view, based on a scanning electron microscope (SEM) image, of an example of the resulting structure. Visible in each column are three approximately 300-nm-thick GaAs resonator layers 200, three approximately 300-nm-thick oxidized layers 205, a GaAs layer 210 at the base of each column, and the GaAs substrate 215. A scale bar in the figure indicates an interval of 1 μm.

The columns had a high aspect ratio, with a height somewhat greater than 2 μm and an average diameter of about 350 nm or somewhat more. The structure was fabricated with a single-step ICP etch, since both AlGaAs and GaAs are etchable under the same conditions. We believe that even greater numbers of layers can be included in structures of this kind. The number of layers in the initial wafer is ultimately limited by the limitations of epitaxial growth. Other limits are practical limits imposed by the thickness of etch mask, the etching conditions, and the demands on the structural strength of the semiconductor materials for supporting the resulting high aspect ratio structures.

With further reference to FIG. 10, it will be seen that the columns are slightly tapered with a diameter of about 350 nm at the top and about 370 nm at the bottom. We believe that by adjusting the etching conditions, we can control the taper angle of the multilayer structure so that the gallium arsenide resonator layers at each respective level within the columns can have a distinct diameter. This can lead to a different resonant wavelength for the resonators at each respective level.

The measured reflectivity spectrum of the three-layer array of FIG. 10 agreed well with the FDTD simulation and clearly indicated the presence of the electric and magnetic dipole resonances seen in the single-layer array and described above.

Nonlinear Optical Processes

Nanostructured dielectric Mie resonators of the kind described above are useful for various types of wavelength conversion resulting from nonlinear optical processes. Our simulation results show high efficiencies of second order nonlinear conversions including second harmonic generation, sum frequency generation and difference frequency generation. The efficiencies are several orders of magnitude higher than the same processes using conventional nonlinear crystals such as BBO or LBO with the same thicknesses (or optical paths).

The high efficiency is also contributed by the high nonlinear coefficients of III-V semiconductors that are about 100 times higher than those of BBO or LBO.

It is known from the theory of Mie scattering that the lowest two resonances of a dielectric body (idealized as an isolated dielectric sphere) are an electric dipole resonance and a magnetic dipole resonance. Many higher-order electric and magnetic Mie resonances are also possible.

We also found out that the highest second harmonic generation efficiency occurs when the second-harmonic frequency coincide with the higher order Mie resonances and the fundamental frequency coincide with the first two dipole resonances (magnetic and electric dipole resonances). This is particularly true here and for other nonlinear processes when both the pump frequency and the converted frequency coincide with respective resonances.

Simulations also show that different resonances (or different combinations of two resonances in the case of sum and difference frequency generation) should be used for optimizing different second-order nonlinear processes.

Using the same nanostructure, we also expect high efficiency of spontaneous parametric down conversion (SPDC). SPDC is useful for generating entangled photon pairs. As such, it has broad applications in quantum information science. We believe that because our nanostructures offer the advantage of ultra-compactness, they can be advantageously be used to replace bulk nonlinear crystals or waveguide structures (which require waveguide coupling) as efficient entangled photon sources.

Using the same nanostructures, we also believe that spontaneous two-photon emission is achievable. Spontaneous two-photon emission involves the simultaneous emission of two photons due to an electronic transition between two levels with different energy. It has been observed in optically pumped bulk gallium arsenide and in electrically driven GaInP/AlGaInP quantum wells. Like spontaneous parametric down-conversion, spontaneous two-photon emission is a fundamental physics process useful for generating entangled photons, among other things.

We believe that electrically driven spontaneous two-photon emission can be achieved by incorporating quantum wells in the resonators. As is well-known in the art, alternating quantum well layers having different band gap energies can be fabricated within, e.g., a gallium arsenide layer by adding other Group III or Group V elements such as indium to lower the band gap or phosphorus to raise it. Further, we believe that the emission can be spectrally tuned by varying the dimensions and compositions of the quantum wells and concomitantly varying the dimensions of the nanostructures so as to tune the resonances.

In some embodiments, multilayer structures such as those described above can be used to further increase the conversion efficiencies of processes such as second harmonic generation, sum frequency generation, difference frequency generation and spontaneous two-photon emission.

As those skilled in the art will understand, an "in-material" wavelength of electromagnetic radiation of a given frequency within a body is the vacuum wavelength divided by the effective refractive index of the body at the given frequency. As those skilled in the art will also understand, a "Mie resonator" is a dielectric body whose dimensions support one or more resonant modes of electromagnetic radiation. Typically, the size of a Mie resonator in all three spatial dimensions is at least one in-material wavelength. For supporting low-order modes, the resonator may be about one in-material wavelength in extent in two or in all three spatial dimensions. For supporting higher-order modes, various spatial dimensions may be commensurate with a multiple of the in-material wavelength.

Design and fabrication of GaAs dielectric Metasurfaces.

We design the GaAs resonators to support Mie magnetic and electric dipole resonances at wavelengths longer (i.e., at lower energy) than those corresponding to the GaAs bandgap. The reason for this is to avoid absorption and to place the excitation within the spectral range of our femtosecond Ti:sapphire laser. It should be noted that for the choice of dipole resonant frequencies reported here, absorption will still occur at those second-harmonic wavelengths that are shorter than the wavelength corresponding to the GaAs bandgap.

At the lowest dipole resonances, the resonators have side dimensions that are roughly the in-material wavelength $\lambda/n$, where $\lambda$ is the free space wavelength and $n$ the refractive index. For operation at higher resonances, side dimensions that are approximately a multiple of the in-material wavelength will generally be desirable.

Our nonlinear metasurface comprises a square lattice of GaAs nanodisk resonators lying on a low refractive index $(Al_xGa_{1-x})_2O_3$ native oxide spacer layer that is formed by selectively oxidizing high-Al content $Al_xGa_{1-x}As$ layers.

The pitch of the resonator array is designed to minimize the interaction between neighboring GaAs resonators. This is desirable in order to minimize line broadening, i.e., spectral broadening of the resonances of the individual resonators due to mutual interaction. Line broadening reduces the quality factor of the resonator and can decrease the amount of field enhancement.

In a practical resonator array, the resonators may be regarded as "substantially non-interacting" if mutual interaction between the resonators results in less than 2% line broadening and less than 2% frequency shifting of the resonances, relative to individual isolated resonators. Under an even stricter standard, the resonators may be considered "non-interacting" if the distance between them is at least the minimal separation that gives optimal performance (other factors held constant) for non-linear frequency conversion.

For applications using non-interacting resonators, it is not critically necessary to the operation of the device for the resonators to be arranged in a regular lattice. However, a regular lattice may be advantageous for the purpose of beam shaping, as well as for achieving a high geometrical coverage factor. Further, a regular lattice may be required in some embodiments in order to establish the conditions necessary for dark modes to emerge in the modal structure of the array. Dark modes may be advantageous for some applications because their resonances can exhibit very high quality factors, which can lead, in turn, to high field enhancement.

Design factors that are important for optimizing nonlinear behavior include the intrinsic nonlinearity of the constituent materials, the field enhancement achieved within the resonator, the modal volume over which enhancement is achieved, and the amount of overlap that is achieved between jointly excited modes or between excited and emissive modes. In regard to the last of these factors, it will often be desirable to maximize the overlap integral of the intrinsic second-order nonlinear susceptibility tensor $\chi^{(2)}$.

We believe that substantial field enhancement and effective operation can be achieved with resonators having any of various shapes. For a resonator having a columnar conformation with a vertical axis perpendicular to the substrate, we mean by "shape" the cross section in a horizontal plane, i.e., the plane parallel to the substrate. Shapes believed to be suitable include the square, non-equilateral rectangle, circle, ellipse, and L-shape (i.e., a square or rectangle with a corner cut away.)

The height and lateral dimensions of the resonators provide design variables that may be useful for tuning the resonances, and in particular for shifting the spectral positions of the magnetic modes relative to the electric modes. This can be advantageous, for example, when designing for the pump frequency to coincide with one of a pair of respective electric and magnetic dipole modes, and for a desired nonlinearly generated frequency to coincide with the other. Likewise, it can be advantageous when designing for two frequencies (e.g., a pump wave and a signal wave whose frequencies are to be added) to coincide with the respective electric and magnetic dipole modes. Engineering of the resonant frequency in this manner can also facilitate tailoring of the emission pattern of the nonlinearly generated output beam.

Fabrication.

An example fabrication sequence begins with the molecular beam epitaxial growth of a 300-nm-thick layer of $Al_{0.85}Ga_{0.15}As$ followed by a 300-nm-thick layer of GaAs on top of a semi-insulating (100)-oriented GaAs substrate. We spin-coat a negative tone hydrogen silsesquioxane (HSQ Fox-16) resist on the sample and pattern circular disks using standard electron-beam lithography that converts the HSQ to $SiO_x$. The unexposed HSQ is developed using tetramethylammonium hydroxide leaving approximately 500-nm-tall $SiO_x$ nano-disks as etch masks for GaAs.

The shape of the $SiO_x$ nano-disks is then transferred onto the GaAs and AlGaAs layers using an optimized chlorine-based inductively-coupled-plasma (ICP) etch recipe. Finally, the sample is placed in a tube furnace at about 420 degrees Celsius for a selective wet oxidization process that converts the layers of $Al_{0.85}Ga_{0.15}As$ into its oxide $(Al_xGa_{1-x})_2O_3$. The resulting oxide has a low refractive index of about 1.6.

The large refractive index contrast between the GaAs resonators and the underlying oxide ensures well-defined Mie modes with tightly confined electromagnetic fields inside the resonators, as is needed for efficient nonlinear optical generation.

Figure 11:
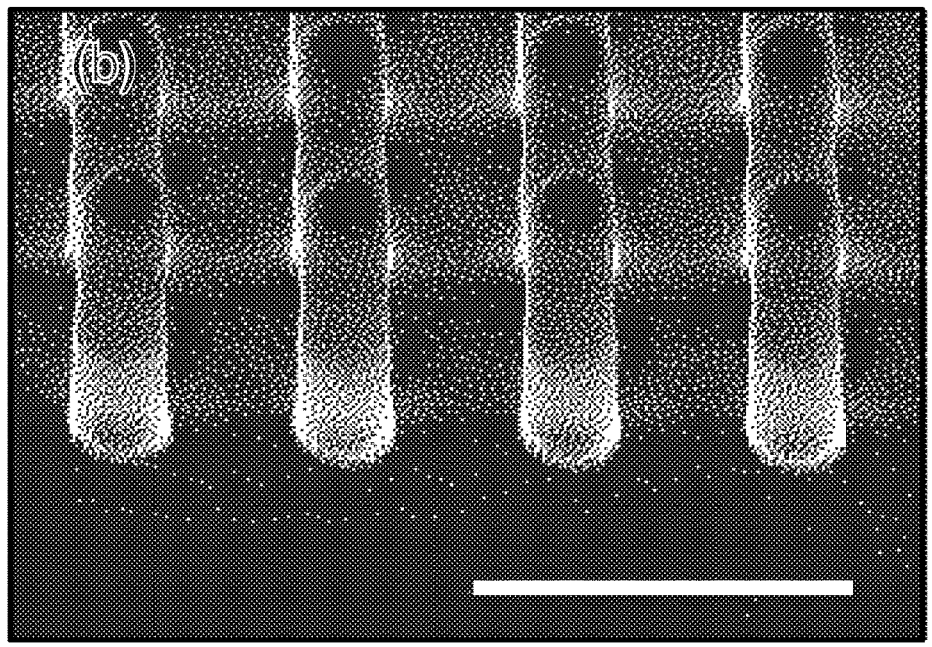
FIG. 11 is a rendered 75° side-view SEM image of a fabricated GaAs dielectric resonator array. The GaAs resonators have the same diameter of about 250 nm and height of 300 nm.
Figure 12:
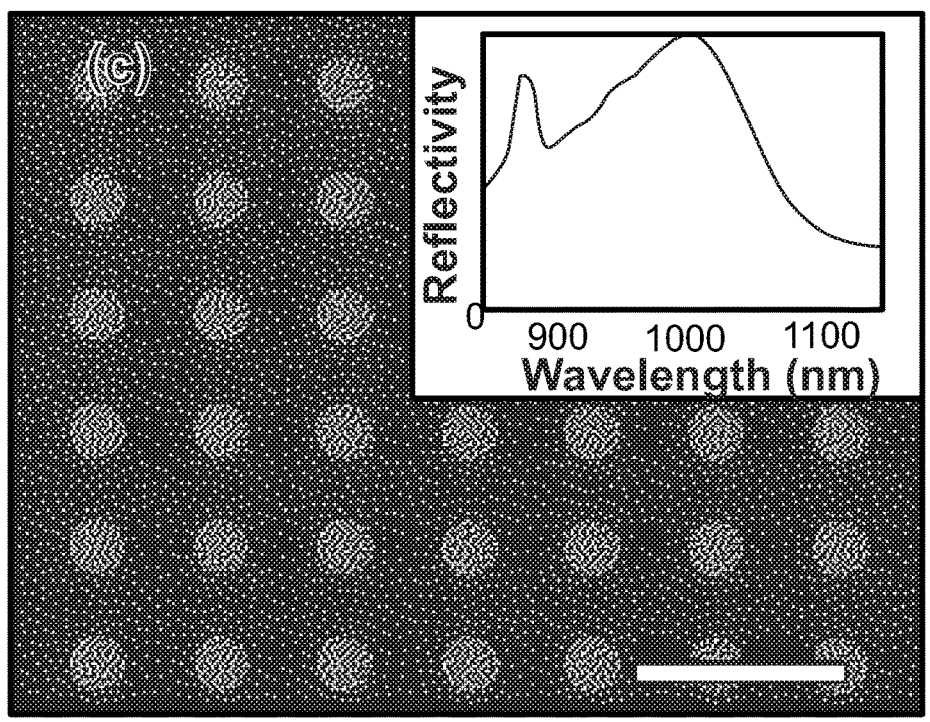
FIG. 12 is a rendered top-view SEM image of the resonator array of FIG. 11. The inset is the reflectivity spectrum of the GaAs resonator array. It will be seen that the spectrum exhibits two well-separated reflectivity peaks corresponding respectively to the magnetic and electric dipole resonances. The scale bars correspond to a length of 1 µm.

FIGS. 11 and 12 respectively show renderings of a 75° degree side-view SEM image and a top-view SEM image of a metasurface consisting of an array of GaAs resonators with diameters of about 250 nm and heights of 300 nm. The side-view image shows clear contrast between the top $SiO_x$ etch mask, the GaAs resonators in the middle, and the AlGaO nano-disks at the bottom. The etch masks are not removed since, due to the low refractive index of $SiO_x$, they barely perturb the distribution or intensity of the electromagnetic fields within the GaAs resonators. The sample has an array pitch of 600 nm resulting in a spacing of about 350 nm between resonators. Consequently, the interaction between the neighboring resonators is negligible.

Resonantly Enhanced SHG in GaAs Resonators

GaAs is known to possess large second-order nonlinearities with $d_{14}$ of about 200 pm/V (picometers per volt). This value is much higher than in conventional nonlinear crystals such as β-barium borate ($d_{22}$ of about 2.2 pm/V) and $LiNbO_3$ ($d_{31}$ of about 6 pm/V and $d_{33}$ of about 30 pm/V). However, efficient SHG using GaAs has been challenging due to the difficulty in meeting phase-matching conditions for long crystals in the zinc-blende crystal structure which exhibits isotropic refractive indices.

In addition, (100)-GaAs possesses only one non-zero $\chi^{(2)}$ tensor element ($d_{14}$), which restricts the choice of nonlinear optical device geometries. In the work described below, however, we found that due to the subwavelength layer thicknesses, resonantly enhanced SHG can be obtained from our GaAs dielectric metasurfaces without any provision for phase matching.

We performed the SHG measurements in reflection geometry because the SHG wavelengths are above the bandgap of GaAs, hence the SH signal in the transmission direction would be completely absorbed by the GaAs substrate.

Figure 13:
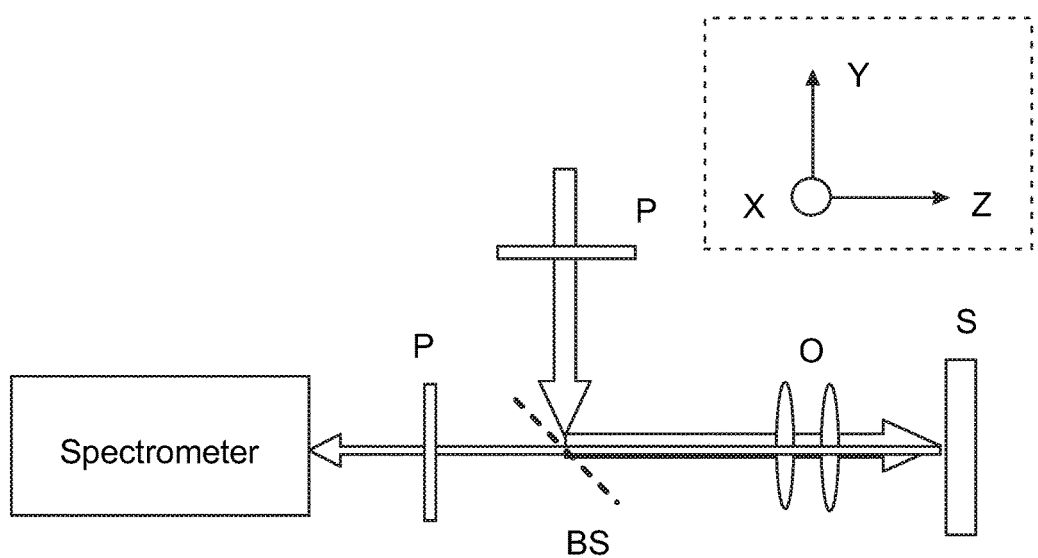
FIG. 13 is a block diagram of an experimental setup for second-harmonic generation (SHG) measurements in a reflection geometry. The legends in the figure have the following meanings: S, sample; O, objective; P, polarizer; BS, beam splitter. The inset shows that a coordinate system is chosen in which the pump propagates along the z axis and the pump polarization is along the x axis.

FIG. 13 shows the experimental setup for measuring reflected SHG intensities and polarizations. We define the coordinate axes as shown in the figure: the sample surface is the x-y plane, and pump propagates along the z axis.

Our optical pump was a mode-locked tunable Ti: sapphire laser oscillator that produced horizontally polarized pulses with 80-MHz repetition-rate and approximately 120 fs pulse width. The pump beam was reflected by a dichroic beam splitter and then focused to a spot diameter of about 6 μm on the sample using a 20× near-infrared objective.

The generated SH was collected by the same objective, then transmitted through the beam splitter and measured using either a power meter or a near-IR spectrometer. The polarization of the SHG was measured using a linear polarizer. The detection efficiency of the entire system was calibrated using a broadband calibration lamp. To simplify the physical interpretation, we rotated the sample about the z-axis so that the pump polarization (along the x axis) was parallel to the [010]-direction of the GaAs wafer.

Figure 14:
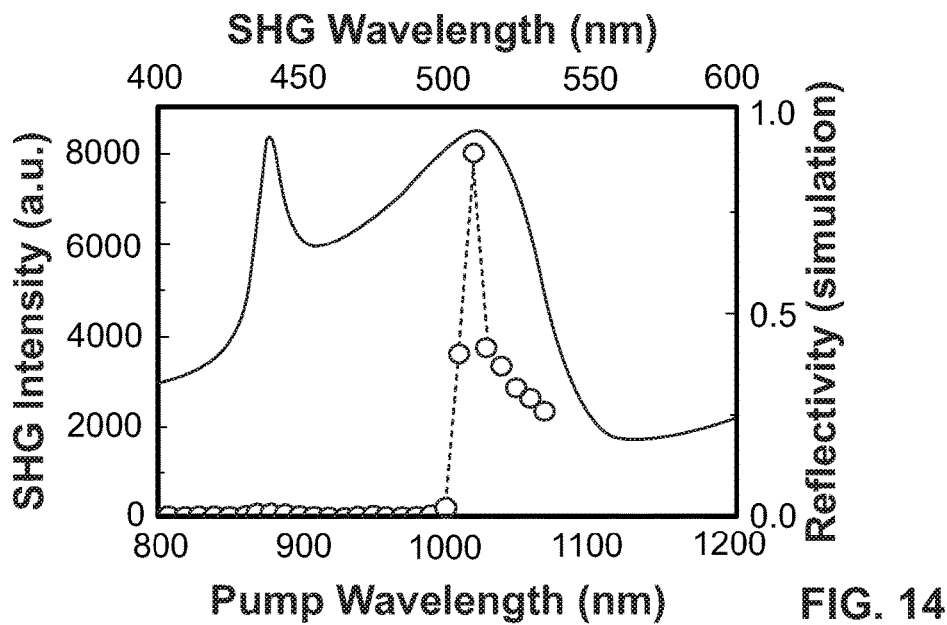
FIGS. 14 and 15 are graphs of experimental results showing the spectral dependence of the SHG intensity on linear and logarithmic scales, respectively. Resonantly enhanced SHG behavior is evident at the magnetic and electric dipole resonances. A background curve included in FIG. 14 is a simulated linear reflectivity spectrum of the sample. A background curve included in FIG. 15 is the corresponding experimentally measured spectrum.
Figure 15:
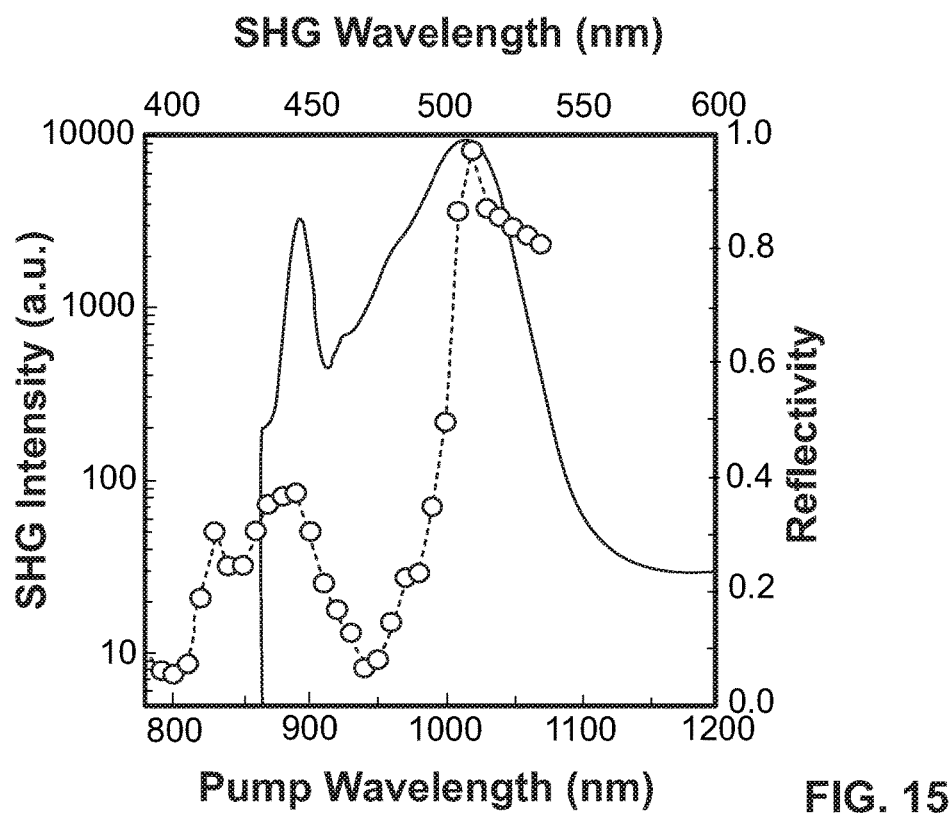

FIGS. 14 and 15 show the SHG intensity on linear and logarithmic scales, respectively, as the pump wavelength is tuned while keeping the pump power constant. The simulated and experimental linear reflectivity spectra are used as the backgrounds for FIGS. 14 and 15, respectively. The SHG power exhibits peaks in the vicinity of the magnetic (about 1020 nm) and electric (about 890 nm) dipole resonances due the electromagnetic field enhancements that occur at these resonances. In this regard, the "field enhancement" is the ratio of the field intensity within the resonator (at a point of interest) to the pump intensity incident on the resonator.

Indeed, electromagnetic simulations described below show that at these resonances the field intensities are about thirty times stronger than the incident pump intensity. The SH signal obtained when the pump coincides with the magnetic and electric dipole resonances are, respectively, more than three orders of magnitude and more than one order of magnitude higher than the signal obtained when pumping at off-resonant wavelengths.

We believe that the large difference in SHG intensities obtained at the magnetic and electric resonances is partly due to higher absorption of GaAs at the shorter SH wavelength associated with the electric dipole resonance, and partly due to different origins of the SHG response at the two dipole resonances. We note that the peak SH signals at the two dipole resonances are even larger (about four orders of magnitude at the magnetic dipole resonance) than the SH signal obtained from unpatterned GaAs.

Figure 16:
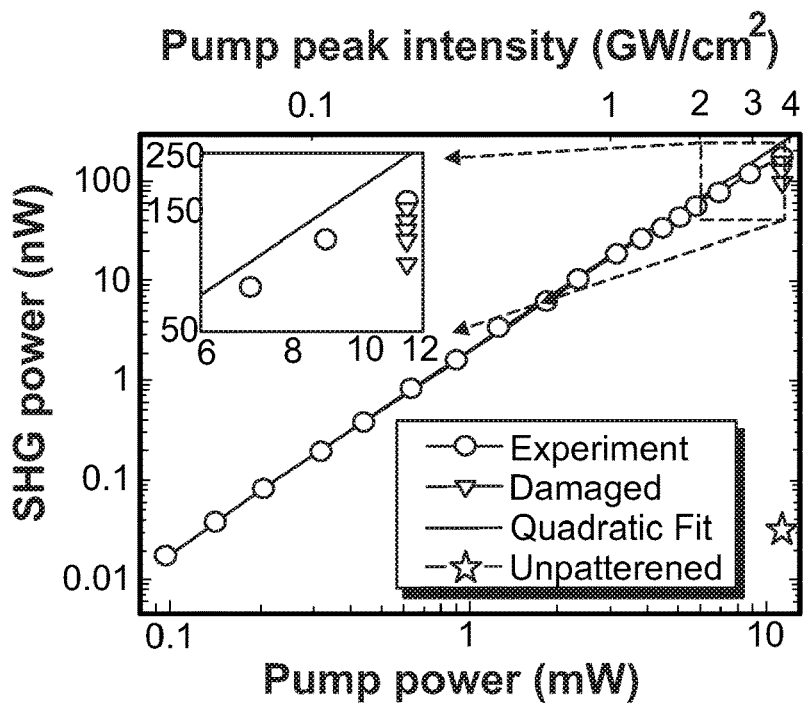
FIG. 16 is a graph of experimental data showing a quadratic relationship between the average pump and SHG powers at low pump intensities. At higher pump intensities, there is seen a deviation from the quadratic relationship that we attribute to damage to the GaAs resonators.

The power dependence of the SHG signal is shown in FIG. 16. This measurement was performed for a pump wavelength of 1020 nm which corresponds to maximum SHG efficiency. The quadratic power relationship was maintained over a wide pump power range until irreversible damage of the GaAs resonators occurred at an average power of about 5 mW (peak intensity of about 1.5 GW/cm²) as shown in the inset of FIG. 16.

Figure 17:
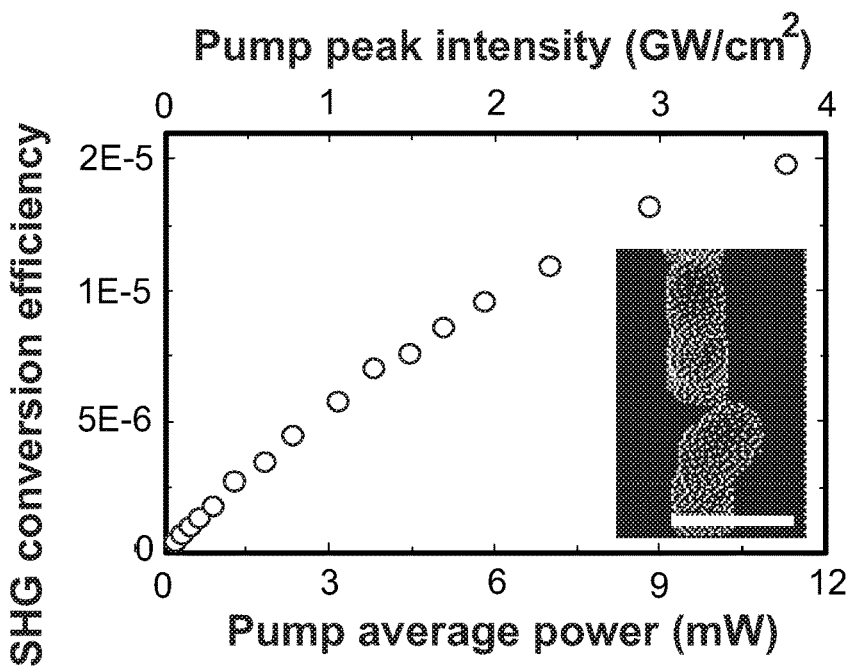
FIG. 17 is a graph of SHG conversion efficiency as a function of the pump power. The inset is an SEM image of damaged GaAs resonators resulting from illumination at a high average pump power of about 27 mW.

At about 11 mW average pump power excitation, the SHG power was seen to decrease continuously over time (as indicated by the black triangles) due to physical damage to the sample. The inset of FIG. 17 shows the severe damage caused to the GaAs resonators after illumination by a much higher average power of 27 mW (peak intensity of ~8.1 GW/cm²). This damage was likely associated with two-photon-absorption by GaAs, followed by thermal damage due to increased free carrier absorption enhanced by the high electric field intensity inside the resonators. This implies that scaling to higher pump powers would require the fabrication of larger resonators, so that the dipole resonances (and, hence the pump photon energy) can be tuned to below one-half the GaAs bandgap.

It should be noted that surface defects created during the process of ICP dry etch could increase the loss of GaAs and therefore contribute to the damage.

FIG. 16 also shows an enhancement of about four orders of magnitude to SHG from the GaAs metasurface relative to SHG on unpatterned GaAs.

FIG. 17 shows that the SHG conversion efficiency increases as the pump power increases, and that it reaches a maximum conversion efficiency of about $2 \times 10^{-5}$ when the pump power is about 11.4 mW (peak intensity of about 3.4 GW/cm²). Before reaching the damage threshold of about 5 mW, the nonlinear coefficient is about $1.5 \times 10^{-8}$ W/W², which is roughly two orders of magnitude higher than a recently published record high SHG efficiency using mode-matching plasmonic nanoantennas.

The SHG enhancements arising from the electromagnetic field enhancements of the GaAs metasurfaces can be treated using the effective second-order nonlinear susceptibility tensor of the metasurface:

$$\chi_{ijk}^{(2)eff} = \frac{\chi_{mnp}^{(2)}}{V} \int_V f_{m(i)}^{2\omega}(x,y,z) f_{n(j)}^{\omega}(x,y,z) f_{p(k)}^{\omega}(x,y,z) dV$$

where $\chi_{mnp}^{(2)}$ is the material's intrinsic second-order nonlinear susceptibility, V is volume, $f^{2\omega}$ is the field enhancement at the SH wavelength, and $f^{\omega}$ is the field enhancement at the fundamental wavelength.

In this case, the SHG power is proportional to $\chi_{ijk}^{(2)eff} \cdot I_p^2$, where $I_p$ is the incident pump intensity. Therefore, it is important to achieve high electromagnetic field enhancements at both the fundamental and SH wavelengths. However, our simulations show weak electromagnetic fields inside the resonators at the SH wavelengths due to the large absorption of GaAs at visible wavelengths. This tends to limit the SHG efficiency that we can achieve.

Simulations also show that the electromagnetic fields are much weaker at the SH of the electric dipole wavelength than at the SH of the magnetic dipole wavelength, which partly explains the large difference between the SHG powers obtained when pumping at the two dipole resonances.

Therefore, we expect substantially greater SHG conversion efficiency in larger GaAs resonators designed for the magnetic dipole resonance to fall at wavelengths longer than twice the GaAs bandgap wavelength, or in resonators in which GaAs is replaced by the higher-bandgap AlGaAs.

It should be noted in this regard that in general, the aluminum fraction x in $Al_xGa_{1-x}As$ is limited as a practical matter to about 0.5 because of the tendency of AlGaAs with greater aluminum content to oxidize in air.

Those changes would reduce absorption at the SH wavelength, thereby permitting greater electromagnetic field enhancements at the SH wavelength, and they would reduce the damage induced by two-photon absorption at larger pump powers. Further improvements could also be obtained by optimizing the resonator shape in order to obtain a maximum modal overlap between the SH and fundamental wavelengths.

Absorption of the converted light by the substrate is a potential detriment when a device is operated in transmission instead of reflection. As those skilled in the art will understand, the converted light is most susceptible to absorption if the photon energy exceeds the substrate bandgap, and is least susceptible to absorption if the photon energy falls below the substrate bandgap. Hence even if the substrate is transparent to downconverted light, the second (or higher) order harmonic light may be substantially attenuated. For such applications, it will be desirable to employ, for example, a flip-chip-based fabrication technique in which the substrate is removed.

Our demonstration paves the way for using dielectric metasurfaces in other phase-matching free nonlinear optical applications such as next-generation nonlinear optical converters for frequency mixing, photon pair generation, and all-optical-optical control and tunability.

For example, we believe that the resonant nanostructures described here can be used for highly efficient spontaneous parametric down conversion to generate entangled photon pairs. In a sense, the down-conversion process is the inverse of the second-harmonic generation process. That is, examples of down-conversion will produce optical output containing a sub-harmonic of the pump, with a photon energy that is one-half the photon energy of the pump.

Example: Frequency-Super-Mixing in Dielectric Metasurfaces

We fabricated a square array of GaAs nanodisk resonators, beginning with molecular beam epitaxial growth of a 400-nm-thick layer of $Al_{0.85}Ga_{0.15}As$ followed by a 450-nm-thick layer of GaAs. Electron-beam lithography and dry etching were used to define the metasurface geometries. Optical isolation was provided by AlGaO native oxide as described above.

Figure 18:
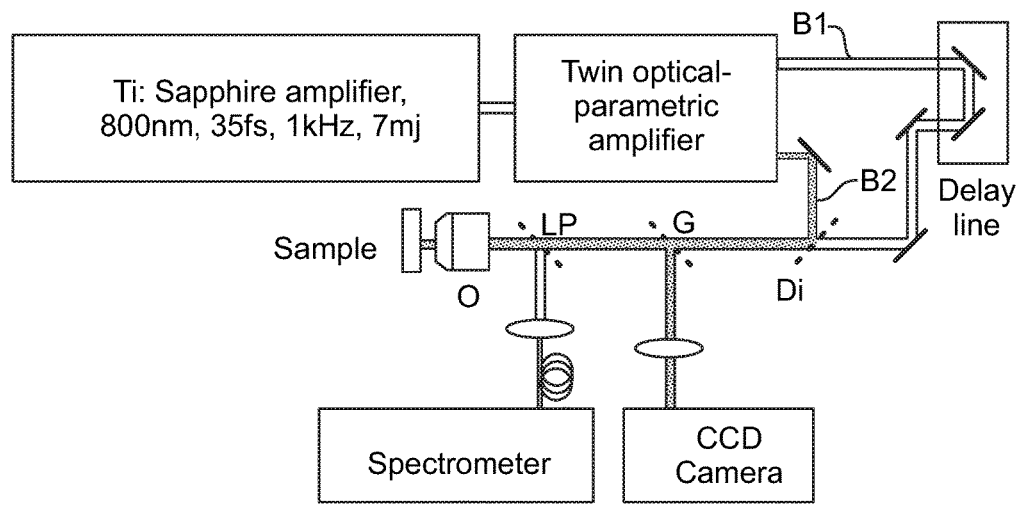
FIG. 18 is a block diagram of the experimental setup for a frequency-super-mixing study that we carried out using a femtosecond laser system.

To study frequency mixing in the GaAs metasurface sample we used two near-infrared femtosecond beams that could independently be spectrally tuned (FIG. 18). FIG. 18 shows the experimental setup. As seen in the figure, two pump beams B1, B2 are generated by an amplified Ti:sapphire laser (1-kHz repetition rate) pumping a twin-optical-parametric-amplifier. As also seen in the figure, a delay line adds a variable relative delay between the pump beams before they are combined by dichroic beam combiner Di. Near-IR objective O focuses the combined beams onto the sample and collects reflected light. The reflected light is directed via 1064-nm long pass filter LP into a spectrometer and directed via glass window G into a CCD camera.

The average powers of the pump beams incident on the metasurfaces were about 10 µW. The focal spots of the pumps were about 40 µm in diameter. For this measurement, we used a metasurface consisting of resonators with diameters of about 420 nm that supported magnetic and electric dipole resonances at about 1520 nm and about 1250 nm, respectively.

Figure 19:
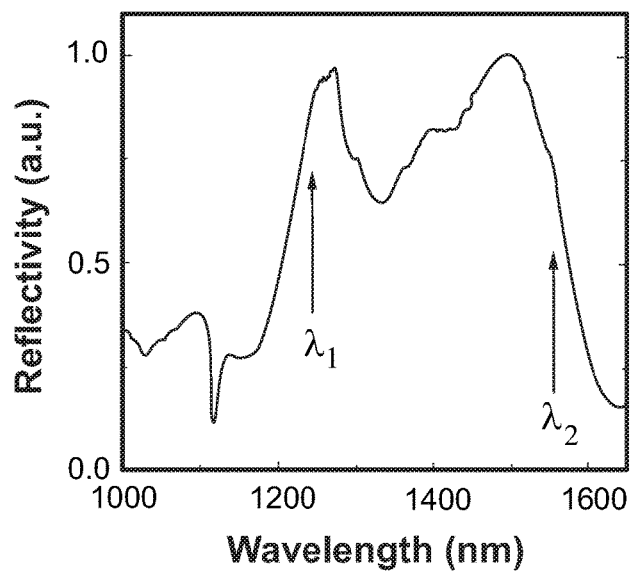
FIG. 19 is a reflectivity spectrum of a metasurface that we characterized in the study of FIG. 18. The two arrows seen in the figure indicate the two pump wavelengths.

FIG. 19 is the measured reflectivity spectrum of the metasurface. Arrows in the figure indicate the spectral locations of the two pump beams ($\lambda_1$ of about 1220 nm and $\lambda_2$ of about 1570 nm). The two reflectivity peaks visible in the figure correspond to the two dipole resonances.

It will be thus be understood from the figure that each of the pump wavelengths was made to overlap with a respective one of the two dipole resonances. That is, each of the pump center wavelengths fell within the bandwidth, at half-maximum, of one of the dipole resonances. We found that this was a factor in optimizing the frequency mixing signal.

To further enhance the conversion efficiency, it may be desirable to optimize the modal overlap between the two resonances. This can be done by varying the resonator geometry, or by introducing mutual interaction between neighboring resonators by reducing the resonator-to-resonator separation.

Figure 20:
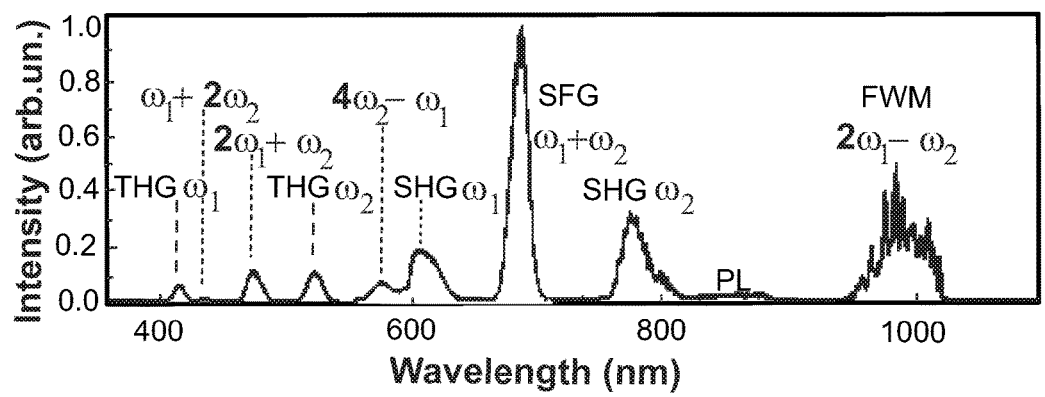
FIG. 20 is a frequency-super-mixing spectrum that we obtained experimentally with a temporally overlapped pair of pump pulses in the study of FIG. 18. The spectrum displays a plurality of newly generated frequencies that have originated from various nonlinear optical processes.

FIG. 20 shows the measured spectrum of frequency-super-mixing in the GaAs metasurface when the two pump pulses spatially and temporally overlap. We observed a total eleven spectral peaks spanning the spectrum from the UV to the near-infrared; the generation mechanism for each of the peaks is notated in the figure. The meanings of the legends in the figure are: SHG, second harmonic generation; THG, third harmonic generation; FHG, fourth harmonic generation; SFG, sum frequency generation; FWM, four-wave mixing; PL, photoluminescence. We identified and confirmed these mechanisms by matching the photon energies and by measuring the power dependence.

Among these peaks, the one centered near 870 nm corresponds to the photoluminescence of GaAs induced by two-photon-absorption of the pump beams. This was confirmed by a control experiment observing photoluminescence from an unpatterned GaAs substrate.

Figure 22:
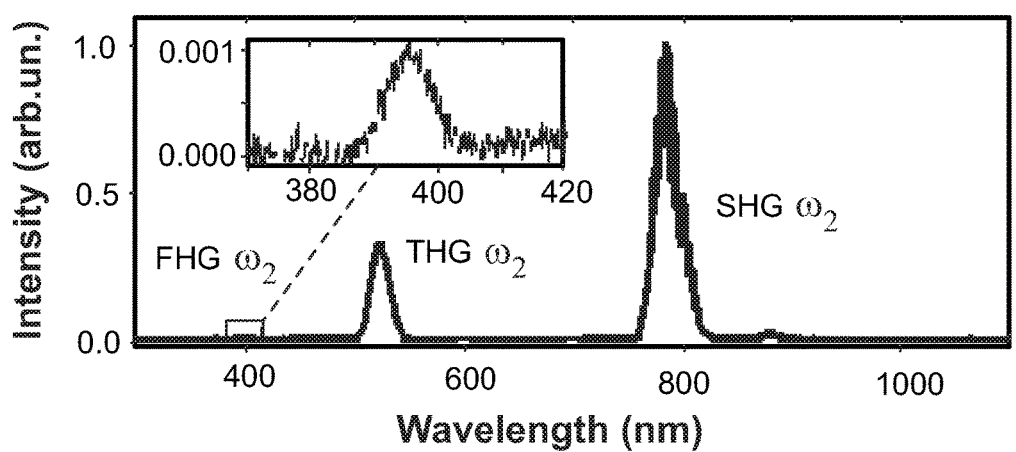
FIG. 22 is a spectrum of second, third, and fourth harmonics generated in the study of FIG. 18 using a single pump beam. The inset shows a zoom-in spectrum of the fourth harmonic.

We categorize the rest of the newly generated frequencies into two groups: (i) those relying on only one of the two pump beams, such as those due to the harmonic processes SHG, THG and FHG (inset of FIG. 22); and (ii) those resulting from the coincidence of both pump beams at the same delay time, such as those due to SFG and FWM as well as other third- and fifth-order nonlinear frequency mixing processes.

We performed a study of the delay-dependent nonlinear frequency mixing spectra. We found that as expected, the harmonic generation processes relying on a single pump beam were observed regardless of the delay. In contrast, the signals relying on frequency-mixing processes such as SFG, FWM ($2\omega_1-\omega_2$), $2\omega_1+\omega_2$, and $\omega_1+2\omega_2$ appeared only when the two pump pulses (also referred to herein as "pump" pulse and "signal" pulse) reached the metasurface simultaneously.

Figure 21:
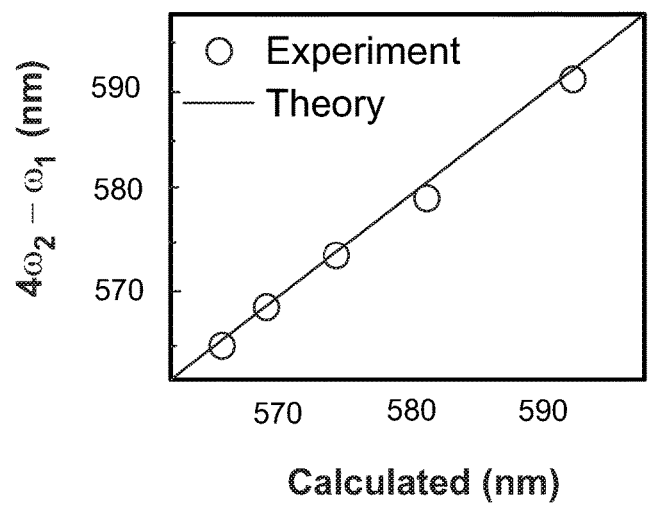
FIG. 21 is a scatterplot of measured versus predicted wavelengths generated by a fifth-order nonlinear optical mixing effect with tuning of the pump wavelengths. The plot confirms that there was $4\omega_2-\omega_1$ frequency mixing.

Additionally, we observed a fifth-order nonlinear optical mixing effect corresponding to $4\omega_2-\omega_1$. We confirmed this process by tuning the wavelengths of the two pumps. Our results are shown in FIG. 21, which is a scatterplot of the measured versus the expected output wavelength for various pump tunings. The pump-wavelength pairs ($\lambda_1, \lambda_2$) in nanometers for the five data points plotted in the figure are, from bottom to top: (1248.4, 1557.6), (1234.8, 1558.6), (1211.4, 1558.8), (1234.8, 1581.2), and (1233.6, 1601).

As expected, the harmonic generation processes were the only nonlinear processes that we observed when the excitation came from a single pump beam only. This is apparent from the spectrum shown in FIG. 22, in which only the first, second, and third harmonics are evident. (The inset in the figure shows a zoom-in of the fourth harmonic.) Higher harmonic generation can be expected if AlGaAs is substituted for GaAs to reduce the material absorption, and if the experimental setup is optimized for the UV spectral range.

Based on the results reported above, we believe that our techniques are potentially useful for performing optical frequency conversion by a variety of nonlinear optical processes. Using a single pump beam, these processes include second harmonic conversion and higher-order harmonic conversion up to the fifth harmonic or even higher. Using two or more pump beams (for example, using a pump beam and a signal beam), these processes include sum frequency conversion and the related process of difference frequency conversion, as well as four-wave mixing. We also believe that higher-order frequency mixing processes can be achieved, such as five-wave mixing and six-wave mixing.

Also included are spontaneous two-photon emission, both by optical pumping and by electrical pumping. We believe that using our resonator arrays, the inverse process, i.e. two-photon absorption, is also achievable and that it may be useful for generating photoluminescence at converted frequencies.

We also believe that using the same techniques, high efficiencies of spontaneous parametric down-conversion (SPDC) will be achievable. SPDC is especially useful as a path for generating entangled photon pairs.

Another useful application of our technique would be for down-converting or up-converting frequency combs using Mie resonators. This could be used to extend the frequency combs to other spectral regimes.

Another nonlinear phenomenon is supercontinuum generation, in which several nonlinear process cooperate to severely broaden the spectrum of a pump beam to produce a smooth spectral continuum. In addition to the various applications described above, we believe that our resonators are potentially useful for supercontinuum generation.

We claim:

1. A method of nonlinear wavelength generation using a nonlinear optical medium and an input flux of pump energy comprising an input beam of electromagnetic radiation having a frequency f, the method comprising:
impinging the input beam onto one or more dielectric optical resonators, each having an optical cavity comprising the nonlinear optical medium, thereby to generate converted light containing at least one converted component having a frequency attainable only through a non-linear process; and
collecting, from the one or more dielectric resonators, a beam of output light comprising the at least one converted component;
wherein:
each of the one or more dielectric optical resonators has at least one Mie resonance that is excited by the input beam;
the at least one Mie resonance of each of the dielectric optical resonators is excited by the input beam;
the generating converted light comprises a process of harmonic generation, and
the at least one converted component comprises a second harmonic of the input beam frequency f.

2. The method of claim 1, wherein the input flux of pump energy is applied to an array of nominally identical dielectric optical resonators.

3. The method of claim 1, wherein the at least one Mie resonance comprises a magnetic dipole resonance or an electric dipole resonance or both an electric dipole resonance and a magnetic dipole resonance.

4. The method of claim 1, wherein each of the one or more dielectric optical resonators has an electric dipole resonance, a magnetic dipole resonance, and resonances of higher order than the electric and magnetic dipole resonances, and wherein the at least one Mie resonance comprises at least one of the higher order resonances.

5. The method of claim 1, wherein the at least one Mie resonance that is excited by the input beam comprises an electric dipole resonance, or a magnetic dipole resonance, or both an electric dipole resonance and a magnetic dipole resonance.

6. A method of nonlinear wavelength conversion using a nonlinear optical medium, one or more dielectric optical resonators, each having an optical cavity comprising the nonlinear optical medium, and at least one input beam of electromagnetic radiation having a frequency f, comprising:
impinging the at least one input beam onto the one or more dielectric optical resonators so as to excite at least one Mie resonance of each of the one or more dielectric optical resonators, thereby to generate converted light containing at least one converted component having a frequency unequal to f; and
collecting, from the one or more dielectric resonators, a beam of output light comprising the at least one converted component;
wherein:
the at least one input beam comprises a pump beam and a signal beam, and the generating converted light comprises at least one process from the group consisting of sum frequency generation, difference frequency generation, four-wave mixing, five-wave mixing, and six-wave mixing.

7. A method of nonlinear wavelength conversion using a nonlinear optical medium, one or more dielectric optical resonators, each having an optical cavity comprising the nonlinear optical medium, and at least one input beam of electromagnetic radiation having a frequency f, comprising:
impinging the at least one input beam onto the one or more dielectric optical resonators so as to excite at least one Mie resonance of each of the one or more dielectric optical resonators, thereby to generate converted light containing at least one converted component having a frequency unequal to f; and
collecting, from the one or more dielectric resonators, a beam of output light comprising the at least one converted component;
wherein:
the at least one input beam comprises a pump beam, and the generating converted light comprises a process of spontaneous parametric down-conversion.

8. A method of nonlinear wavelength conversion using a nonlinear optical medium, one or more dielectric optical resonators, each having an optical cavity comprising the nonlinear optical medium, and at least one input beam of electromagnetic radiation having a frequency f, comprising:
impinging the at least one input beam onto the one or more dielectric optical resonators so as to excite at least one Mie resonance of each of the one or more dielectric optical resonators, thereby to generate converted light containing at least one converted component having a frequency unequal to f; and
collecting, from the one or more dielectric resonators, a beam of output light comprising the at least one converted component;
wherein:
the nonlinear optical medium comprises a semiconductor host and a quantum well multilayer embedded in the semiconductor host.

9. A method of nonlinear wavelength conversion using a nonlinear optical medium, one or more dielectric optical resonators, each having an optical cavity comprising the nonlinear optical medium, and at least one input beam of electromagnetic radiation having a frequency f, comprising:
impinging the at least one input beam onto the one or more dielectric optical resonators so as to excite at least one Mie resonance of each of the one or more dielectric optical resonators, thereby to generate converted light containing at least one converted component having a frequency unequal to f; and
collecting, from the one or more dielectric resonators, a beam of output light comprising the at least one converted component;
wherein:
the at least one input beam comprises a pump beam, the nonlinear optical medium has a transition energy, and the generating converted light comprises a process of two-photon emission with emitted photon energies that are less than the transition energy.

10. The method of claim 9, wherein the nonlinear optical medium comprises a semiconductor host and a quantum well multilayer embedded in the semiconductor host, the quantum well multilayer supports at least one inter-subband transition, and the inter-subband transition provides the nonlinear optical medium transition energy.

11. A method of nonlinear wavelength conversion using a nonlinear optical medium, one or more dielectric optical resonators, each having an optical cavity comprising the nonlinear optical medium, and at least one input beam of electromagnetic radiation having a frequency f, comprising:

impinging the at least one input beam onto the one or more dielectric optical resonators so as to excite at least one Mie resonance of each of the one or more dielectric optical resonators, thereby to generate converted light containing at least one converted component having a frequency unequal to f; and collecting, from the one or more dielectric resonators, a beam of output light comprising the at least one converted component;

wherein:

the at least one input beam comprises a pump beam and a signal beam, and the pump beam and the signal beam each excite a respective Mie resonance of the one or more dielectric optical resonators.

12. A method of nonlinear wavelength conversion using a nonlinear optical medium, one or more dielectric optical resonators, each having an optical cavity comprising the nonlinear optical medium, and at least one input beam of electromagnetic radiation having a frequency f, comprising:

impinging the at least one input beam onto the one or more dielectric optical resonators so as to excite at least one Mie resonance of each of the one or more dielectric optical resonators, thereby to generate converted light containing at least one converted component having a frequency unequal to f; and collecting, from the one or more dielectric resonators, a beam of output light comprising the at least one converted component;

wherein:

the one or more dielectric optical resonators have at least two Mie resonances, one said Mie resonance is excited by the input beam, and at least one other Mie resonance is excited by the at least one converted component.

13. A method of nonlinear wavelength generation using a nonlinear optical medium and an input flux of pump energy, comprising:

applying the input flux of pump energy to one or more dielectric optical resonators, each having an optical cavity comprising the nonlinear optical medium, thereby to generate converted light containing at least one converted component having a frequency attainable only through a non-linear process; and collecting, from the one or more dielectric resonators, a beam of output light comprising the at least one converted component;

wherein:

each of the one or more dielectric optical resonators has at least one Mie resonance that is excited by the input flux of pump energy; and the input flux of pump energy is an electric current and the nonlinear process is two-photon emission, or spontaneous parametric down-conversion, or both two-photon emission and spontaneous parametric down-conversion.

* * * * *